US009003059B2

(12) United States Patent
Ozzie et al.

(10) Patent No.: US 9,003,059 B2
(45) Date of Patent: Apr. 7, 2015

(54) RUNNING APPLICATIONS IN AN ONLINE OR OFFLINE MODE BASED ON THE AVAILABILITY OF THE CONNECTION TO THE REMOTE WEB SERVER

(75) Inventors: Raymond E. Ozzie, Seattle, WA (US); Jack E. Ozzie, North Bend, WA (US); George P. Moromisato, Seattle, WA (US); Raman Narayanan, Kirkland, WA (US); Matthew S. Augustine, Seattle, WA (US); Dharma K. Shukla, Sammamish, WA (US); Ori M. Amiga, Seattle, WA (US); Ming Liu, Redmond, WA (US); Arash Ghanaie-Sichanie, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1341 days.

(21) Appl. No.: 12/058,758

(22) Filed: Mar. 31, 2008

(65) Prior Publication Data
US 2009/0248695 A1    Oct. 1, 2009

(51) Int. Cl.
G06F 7/00 (2006.01)
G06F 15/16 (2006.01)
G06F 15/173 (2006.01)
G06F 15/177 (2006.01)
H04L 12/28 (2006.01)
H04L 29/08 (2006.01)
G06F 17/30 (2006.01)
H04L 29/12 (2006.01)

(52) U.S. Cl.
CPC ...... *H04L 67/2861* (2013.01); *G06F 17/30899* (2013.01); *H04L 29/12009* (2013.01); *H04L 61/2514* (2013.01); *H04L 67/2814* (2013.01); *H04L 67/34* (2013.01); *H04L 67/02* (2013.01); *H04L 67/289* (2013.01)

(58) Field of Classification Search
CPC ... H04L 67/2861; H04L 57/289; H04L 67/02; H04L 67/34; H04L 29/12009; H04L 67/2814; H04L 61/2514; G06F 17/30899
USPC .......... 709/245, 219, 221, 226; 370/252; 707/610
See application file for complete search history.

(56) References Cited

U.S. PATENT DOCUMENTS 5,583,993 A * 12/1996 Foster et al. .................. 709/205
5,680,549 A * 10/1997 Raynak et al. ................ 709/227
6,223,212 B1 * 4/2001 Batty et al. ................... 709/204

(Continued)

OTHER PUBLICATIONS

Klemm, WebCompanion: A Friendly Client-side Web Prefetching Agent, IEEE Transactions on Knowledge and Data Engineering, vol. 11, No. 4, Jul./Aug. 1999, IEEE, 1999, pp. 577-594.

(Continued)

*Primary Examiner* — Daniel C Murray
(74) *Attorney, Agent, or Firm* — Bryan Webster; Kate Drakos; Micky Minhas

(57) ABSTRACT

Systems and methods for implementing online and offline applications are described. Such systems and methods may in some cases provide the same programming interface, regardless of whether the application is online or offline. Such systems and methods may also or instead in some cases provide additional or other possible capabilities, including installation without elevated privileges, simplified data synchronization, sharing of applications and application data, access to data from other applications, and richer client functionality than may be provided by an application such as a web browser.

20 Claims, 10 Drawing Sheets

(56) References Cited

U.S. PATENT DOCUMENTS

| | | | |
|---|---|---|---|
| 6,446,119 B1* | 9/2002 | Olah et al. | 709/224 |
| 6,584,493 B1* | 6/2003 | Butler | 709/204 |
| 6,742,026 B1* | 5/2004 | Kraenzel et al. | 709/222 |
| 6,854,016 B1* | 2/2005 | Kraenzel et al. | 709/229 |
| 6,983,416 B1* | 1/2006 | Bae et al. | 715/234 |
| 6,990,513 B2* | 1/2006 | Belfiore et al. | 709/203 |
| 7,143,419 B2* | 11/2006 | Fischer et al. | 719/328 |
| 7,263,551 B2* | 8/2007 | Belfiore et al. | 709/219 |
| 7,272,782 B2 | 9/2007 | Sneh | |
| 7,447,745 B2* | 11/2008 | Lehavi | 709/206 |
| 7,454,462 B2* | 11/2008 | Belfiore et al. | 709/203 |
| 7,568,005 B2* | 7/2009 | Nichols et al. | 709/204 |
| 8,245,128 B1* | 8/2012 | Ahad et al. | 715/234 |
| 8,756,254 B2* | 6/2014 | Parker et al. | 707/802 |
| 2001/0049721 A1* | 12/2001 | Blair et al. | 709/203 |
| 2002/0059425 A1* | 5/2002 | Belfiore et al. | 709/226 |
| 2002/0083145 A1* | 6/2002 | Perinpanathan | 709/213 |
| 2002/0184085 A1* | 12/2002 | Lindia et al. | 705/11 |
| 2003/0023657 A1* | 1/2003 | Fischer et al. | 709/102 |
| 2003/0055927 A1* | 3/2003 | Fischer et al. | 709/221 |
| 2003/0158947 A1* | 8/2003 | Bloch et al. | 709/227 |
| 2003/0233404 A1* | 12/2003 | Hopkins | 709/203 |
| 2004/0064570 A1* | 4/2004 | Tock | 709/228 |
| 2004/0216126 A1* | 10/2004 | Hiltgen | 719/311 |
| 2005/0197819 A1 | 9/2005 | Hopkins et al. | |
| 2005/0246415 A1* | 11/2005 | Belfiore et al. | 709/203 |
| 2005/0254435 A1* | 11/2005 | Moakley et al. | 370/252 |
| 2005/0273486 A1* | 12/2005 | Keith, Jr. | 709/200 |
| 2006/0177015 A1* | 8/2006 | Skakkebaek et al. | 379/67.1 |
| 2006/0230124 A1* | 10/2006 | Belfiore et al. | 709/219 |
| 2007/0033155 A1* | 2/2007 | Landsman | 707/1 |
| 2007/0033569 A1* | 2/2007 | Davidson et al. | 717/103 |
| 2007/0083486 A1 | 4/2007 | Bloch et al. | |
| 2007/0174399 A1* | 7/2007 | Ogle et al. | 709/206 |
| 2007/0204057 A1 | 8/2007 | Shaver et al. | |
| 2007/0276836 A1 | 11/2007 | Chatterjee et al. | |
| 2008/0086540 A1* | 4/2008 | Scott et al. | 709/217 |
| 2008/0222628 A1* | 9/2008 | Batra et al. | 717/171 |
| 2008/0271059 A1* | 10/2008 | Ott et al. | 719/328 |
| 2008/0301221 A1* | 12/2008 | Arvidsson et al. | 709/203 |
| 2009/0094332 A1* | 4/2009 | Schemers et al. | 709/206 |
| 2009/0150550 A1* | 6/2009 | Barreto et al. | 709/228 |
| 2009/0172086 A1* | 7/2009 | Arthursson et al. | 709/203 |
| 2009/0172101 A1* | 7/2009 | Arthursson | 709/205 |
| 2009/0228545 A1* | 9/2009 | Mendez et al. | 709/202 |
| 2009/0248695 A1* | 10/2009 | Ozzie et al. | 707/10 |
| 2009/0259744 A1* | 10/2009 | Kolke et al. | 709/224 |
| 2014/0164489 A1* | 6/2014 | Gopal et al. | 709/203 |

OTHER PUBLICATIONS

Bochicchio et al., "JWeb: an HDM Environment for Fast Development of Web Applications", IEEE International Conference on Multimedia Computing and Systems, vol. 2, IEEE, 1999, pp. 809-813.

"The Dojo Offline Toolkit", retrieved on Dec. 12, 2007 at <<http://dojotoolkit.org/offline>>, The Dojo Foundation, pp. 2.

"Google Launches Tool that Enables Offline Web Applications", retrieved at <<http://www.dmxzone.com/showDetail.asp?NewsId=13678&TypeId=1>>, May 31, 2007, pp. 3.

"Google Gears API", Google, 2008, pp. 2.

Kilani, "Taking Web Applications Offline with Google Gears", Aug. 2007, pp. 13.

"Prism", Oct. 24, 2007, Mozilla Labs, pp. 47.

"Adobe AIR", 2008, Adobe Systems Incorporated, pp. 2.

"Adobe Integrated Runtime", retrieved at <<http://en.wikipedia.org/wiki/Adobe_integrated_Runtime>>, 2008, Adobe Systems Incorporated, pp. 3.

"Yahoo! Widgets", retrieved at <<http://widgets.yahoo.com/tools/>>, 2008, Yahoo! Inc., pp. 2.

"Google Desktop Gadget API", 2008, Google, pp. 3.

"Windows Live Dev—Gadgets", 2008, Microsoft Corporation, pp. 3.

"Google Gears", retrieved on Mar. 27, 2008 at <<http://en.wikipedia.org/wiki/Google_Gears>>, pp. 2.

"Yahoo! Widgets", retrieved on Mar. 27, 2008 at <<http://enwikipedia.org/wikiYahoo!_Widgets>>, pp. 5.

\* cited by examiner

RUNNING APPLICATIONS IN AN ONLINE OR OFFLINE MODE BASED ON THE AVAILABILITY OF THE CONNECTION TO THE REMOTE WEB SERVER

BACKGROUND

As the reliability and availability of networks grow, more people and organizations become comfortable with performing computing tasks using functionality provided online. For example, many applications that would have previously been provided only as stand-alone or "shrink-wrapped" applications that ran locally on a particular computing device may now be accessed over a network using a web browser or other connected application or executable code. Such applications are often referred to as "online applications," "web applications," and the like. As just one of many examples, many people today use "web-based email" applications, such as "Hotmail," provided by Microsoft Corporation of Redmond, Wash., or "Gmail," provided by Google Corporation, of Mountain View, Calif. In such an application, for example, one or more "server" computing devices may hold user interface information, executable code, and data associated with the application, and provide such information to a web browser or other similar application. When a user submits a request—in one example using a web browser application and HTTP—the one or more servers may execute code and respond with the appropriate information. In a mail application, this information may include a user interface that displays and enables a user to interact with email.

While such online applications provide many desirable characteristics, they also have elements that are less preferable. One important characteristic of an application that is truly only accessible online is that such an application absolutely requires network connectivity: even if a user's computing device is otherwise operating normally, if the device can't connect over a network to the server or servers that provide the application, then the user can't use the application or access the desired data. Even though networks have continually become more ubiquitous, network connectivity may still be limited for a variety of reasons—in some geographic areas network connectivity may not be available at all and in areas that do have network connectivity, such connectivity may be slow, may enable only relatively small amounts of data to be exchanged, may be intermittently or not consistently available, or may have other limitations.

For these and other reasons, it may be desirable to provide access to such online or server-provided applications and data when a user or device is "offline." That is, for example, it may be desirable to enable a user to access some or all of the functionality of an online application or some or all of the data associated with an online application when the user's device is offline or not connected to a network or to the server or servers providing the application.

There are a wide variety of ways in which such offline applications may be implemented. Generally, many methods transfer at least portions of application functionality and data from a server or servers to a client device when network connectivity is available. Such pre-transferred functionality and data is then used, in a variety of ways, if or when the device does not have network connectivity, when the quality of device's network connectivity is below a particular threshold, when the user or some other entity chooses to use the local functionality even when connectivity is available, or in other instances.

For example, in some implementations a user may install some set of software or executable instructions on a client device. Such software may then download or transfer at least particular parts of an application and store such parts locally on the client device. In some particular implementations, such software may install functionality that extends or uses "hooks" into a web browser application (or other application), so that when a user requests some part of a particular application—such as a particular HTML page associated with an application—the browser extension, or possibly "protocol handler" in this particular example, determines that the requested page is stored locally and provides the page without a request to a remote server. While such browser extensions may be somewhat more difficult to install—they may require elevated, administrative, or root permissions, for example, because they modify the operation of a browser in a way that may in some cases be considered "unsafe"—they also provide one way to provide at least some portions of an application when a device cannot connect to a remote server.

In the same or other implementations, additional software may perform other tasks useful as part of providing an application in an offline mode, including as part of accessing "dynamic data." In at least some contexts, "dynamic data" may be defined to be data that may be different for different users, for different instances of a particular application, and so on. As a specific example, in an email application dynamic data may include the specific email messages associated with a particular user, the user's email address, and the like. (It should be noted that just because a part of an application is not "dynamic data," as defined here, does not necessarily mean that that part of the application is entirely or completely static and will not ever change.) In some implementations, when a user makes a request to an application that accesses dynamic data or that changes dynamic data (including adding new data, updating existing data, and deleting existing data), the code in the application may first determine if the application is an online or offline. If the application is online, such a request may be dispatched to a remote server. Such operation may in many cases be the same as a typical online application with no offline functionality: when a user visits a particular web site to view their email, the requests for their email—the dynamic data—are transmitted to a remote server that in turn responds with new pages that include the requested email message or messages.

However, when an application is offline, application code itself (or code used or associated with the application) may determine that the application is offline and then attempt to access the dynamic data in a different way. For example, in some implementations, the code may test for online or offline status and when the application is offline may request data from or change data in a database that is located on the local device. While such an implementation may enable an application to be used when a device cannot connect to a remote server, it also may significantly increase the complexity of the application, which may in turn make the application more difficult or costly to develop, may make the application more susceptible to problems or "bugs," and so on. For example, rather than always assuming that data can be accessed in one particular way, such an application may have to consider the case where data is accessed differently, using a remote or local store. Such an application also may need to manage, for example, the schema and data in the local database or data store, may need to determine when and how to synchronize the data in the local data store with a remote data store, and so on.

SUMMARY

The following presents a simplified summary of the disclosure in order to provide a basic understanding to the reader.

This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies for implementing online and offline applications. Such techniques and technologies may in some cases provide the same programming interface regardless of whether the application is online or offline. The same or other techniques and technologies may also or instead provide additional or other possible benefits, including installation without elevated privileges, simplified data synchronization, sharing of applications and application data, access to data from other applications, and richer client functionality than may be provided by an application such as a web browser.

DETAILED DESCRIPTION

Described herein are various techniques and technologies directed toward the implementation of online and offline applications. More particularly, such techniques and technologies may in some cases provide the same programming interface, regardless of whether the application is online or offline. The same or other techniques and technologies may also or instead provide additional or other possible benefits, including installation without elevated privileges, simplified data synchronization, sharing of applications and application data, access to data from other applications, and richer client functionality than may be provided by an application such as a web browser.

Figure 1:
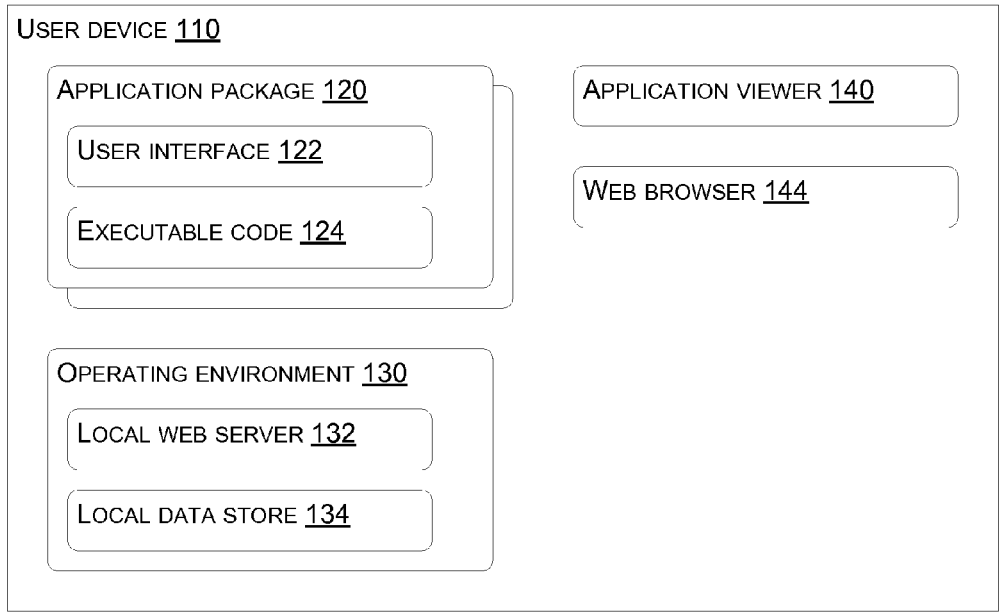
FIG. 1 illustrates an exemplary system in which online and offline applications may be developed and used.
Figure 1:
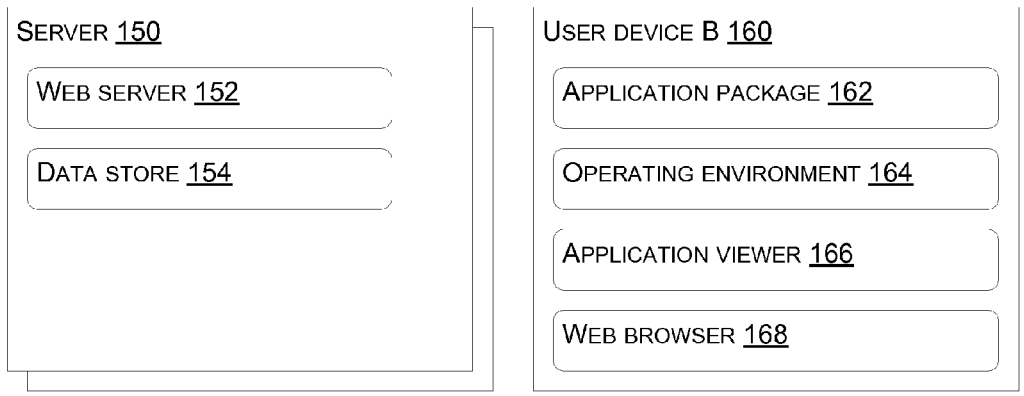
Figure 1:
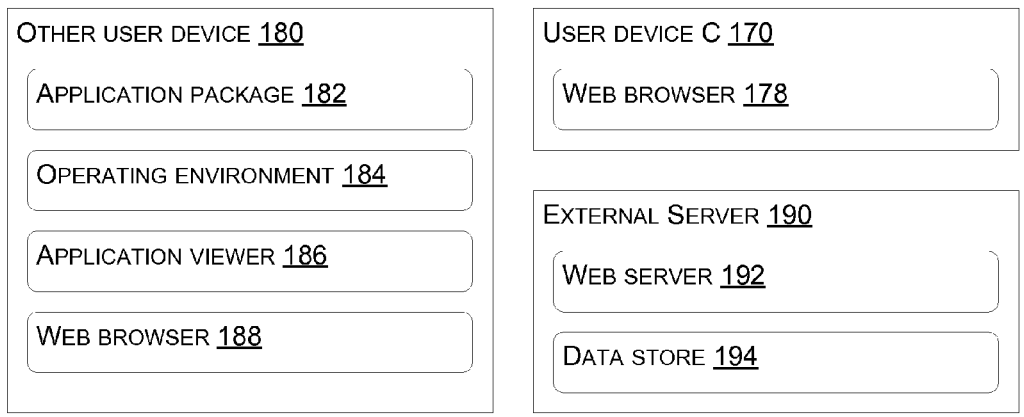
Figure 1:

Turning now to FIG. 1, shown therein is an exemplary system 100 in which online and offline applications may be developed and used. The exemplary system 100 contains a user device 110, a server 150, a user device B 160, a user device C 170, an other user device 180, and an external server 190. The exemplary user device 110 is shown as including an application package 120 that in turn includes a user interface 122 and executable code 124, an operating environment 130 that in turn includes a local web server 132 and local storage 134, an application viewer 140, and a web browser 144. The exemplary server 150 is shown as including a web server 152 and a data store 154. The exemplary user device B 160 is shown as including an application package 162, an operating environment 164, an application viewer 166, and a web browser 168. The exemplary user device C 170 is shown as including a web browser 178. The exemplary other user device 180 is shown as including an application package 182, an operating environment 184, an application viewer 186, and a web browser 188. Finally, the exemplary external server 190 is shown as including a web server 192 and a data store 194. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

First, without considering offline usage of an application, at least some typical online applications may involve, for example, a user device 110 and the device's web browser 144 communicating with a web server 152 associated with a server 150. In this, and at least some other examples, the user device 110 may be a computing device of some type, including a desktop computer, a laptop or notebook computer, a mobile phone or personal digital assistant (PDA), and so on. The server 150 may be a server computer in a data center, but may also be a desktop computer, laptop computer, or in fact a computing device of a variety of types and in a variety of locations, as long as it may perform at least some of the functions described herein with reference to the server 150. Furthermore, although not shown in detail, the server 150 may not be a single computing device and may in some cases be comprised of multiple server computers connected in one or more of a variety of ways. For example, in some implementations, such as possibly in a data center, particular functionality—such as, say, the web server 152—may be implemented on some number of computing devices, while other functionality is implemented on other computing devices. At least some of the description provided herein may refer to the server 150 as a single computer, but such description should be understood to also apply to a variety of systems that use multiple computing devices to provide the same or similar functionality. The computing devices associated with the user device 110 and the server 150, as well as the computing devices associated with, for example, the user device B 160, the user device C 170, the other user device 180, and the external server 190, are also described below in more detail below with reference to FIG. 10.

In at least one exemplary implementation of an online application, the web browser 144 may communicate over one or more of a variety of networks or other communication means with the server 150. On the server, a web server 152 may accept requests from the web browser and respond to such requests with relevant or associated information. As just one example, a user may instruct the web browser to retrieve a particular HTML page associated with some web application. The web server may receive such a request and provide the requested page. The user may then interact with the page and possibly submit additional requests to the web server for additional pages, additional data, and so on. The web server may respond to such additional requests by providing additional information including pages that, in some implementations, use data from the data store 154. Such a data store may be any store of data, implemented on the server or on any combination of the server and other devices, including other servers, separate storage devices, and so on. In some implementations, some or all of the data store may be implemented as one or more relational or other database systems. In such implementations, and in other implementations, the server may in some cases query the database for data associated with a request and then return a response that includes some portion of the retrieved data. In some implementations, the data store may also hold other data, including possibly web pages that comprise all or part of the application, configuration data, and many other types and kinds of data. In the same or other implementations, pages and/or other application-related functionality may be stored as files, or in some other manner.

While a typical online application may be implemented in a variety of ways, including using techniques as described previously, an application that will be used offline may be implemented using different and/or additional techniques. For example, in some cases an application may comprise or be embodied in an application package, such as the exemplary application package 120. At least some application packages may include user interface information 122 as well as executable code 124. For example, in the case where an application package embodies a web application comprised of, among different possibilities, HTML pages, CSS stylesheets, and JavaScript code, the user interface may include the HTML pages and CSS stylesheets and the executable code may include the JavaScript code. The application package may be defined, at least in part, by an "application manifest" that specifies the components or elements that make up the user interface and executable code portions, as well as other information, such as, for example, configuration settings for the application or other application metadata. As one specific example, the application manifest that defines an application package for a web application might be implemented as a text or XML file that includes, again for example and without limitation, an entry for each HTML page (as a file reference, for example), an entry for each CSS stylesheet, and an entry for each file containing JavaScript code. Such an application manifest might also include metadata including a name for the application, information that identifies the author or distributor of the application, a specification of the data used by the application (some examples of which will be provided in more detail below), whether the application may be shared with other users, and other configuration information or metadata related to the application or to other settings or information.

In some implementations, an application manifest may be used by a tool or utility as part of creating an embodiment of an application package for a particular application. For example, given an application manifest and the files or other information specified by the manifest (or specified through other means or assumed implicitly), it may be possible to run such a tool or utility and obtain, say, a single compressed archive file—such as a .ZIP, .TAR, or .TGZ archive. As used herein, an application package may in at least some implementations generally include an application manifest as well as the information or files referenced by the manifest. An application package may be therefore considered to be independent of the actual format or formats—such as a particular compression format—in which the application package is embodied. Some ways in which an application package may be created are described in more detail below, with reference to FIG. 2.

It should be noted generally that "offline" applications are not necessarily only useful or relevant when a device cannot connect to a remote server or external network. That is, the term "offline" as used herein should generally be considered to relate to the use of an application without requiring the use of a remote server or an external network, even if such a remote server or external network is available. For example, for a variety of reasons, a user or other entity may choose to use a local or offline copy or instance of an application even when a remote server or external network is available and might enable the same or a similar application to be used in an online mode. Among many reasons, the use of a local or offline application may in some cases provide performance advantages when compared to the use of an online application that requires communication with one or more remote servers. In addition, in some cases applications that are used offline or from a local device may perform some of their interactions locally, but may also perform some interactions using one or more remote servers, if such servers are available. For example, an application might access some set of its information using the local device and access other information from a remote device—this may be useful, as just one example, to enable an application to retrieve more up to date information if a remote server is available, even when the application is running primarily against information that is stored locally.

Given that an application package may include a significant amount, if not all, of the information needed to define and provide an application, in some implementations, application packages may be used by the server 150 as part of providing an application from the server. For example, in some implementations it may be possible to "add" or "provide" an application package to a server and then instruct the server to make that application available to users or computing devices that use the server or other associated servers or computing devices. The specific manner in which an application package might be used by a server as part of providing an application may vary, depending on factors such as the contents of the application package and the manner in which the server operates. However, in one specific example when the application package is comprised of HTML pages, CSS stylesheets, and the like—perhaps as described above—it may be possible for the server to host the application by responding to requests by retrieving and returning HTML pages, CSS stylesheets, and other data from the application package. Some ways in which a user may use a hosted or online application, when provided by a server, are described in more detail herein, especially with reference to FIG. 3 and FIG. 4.

An application package may also in some implementations be used as part of providing offline access to an application, when a remote server is not available or simply when it may not be desirable to use a remote server for some reason (even if the server is available). The manners in which an application package may be used as part of providing offline access may be widespread and varied. In at least some implementations, a user may obtain and install (or may already have access to) additional functionality that enables the use of an application package when offline, or without requiring connectivity to a remote server. For example, a user's device may include an operating environment that includes particular executable code, among other things, such as the operating environment 130. An operating environment may provide a variety of functionality useful for making applications available offline, among other purposes. In some examples, an operating environment may include a local web server 132 and a local data store 134. In some implementations, the operating environment may be referred to as a "mesh" operating environment, because it may enable—through synchronization of data (including "mesh objects," as introduced below), for example—communication between a variety of devices organized in mesh topology, without necessarily including required centralized servers or endpoints.

Using such an operating environment, a user—through a web browser, or possibly through another application, including an application viewer 140 as described below—may request an element that is part of an application, such as a page, stylesheet, or file with executable code. Such a request may in some instances be satisfied by, for example, the local web server 132 rather than being satisfied by a remote or non-local web server, such as web server 152. As a result of being satisfied locally, a remote server may not be needed, and at least the portion of the application associated with this request may in some cases be used offline or when it is not desirable to access a remote server.

In some implementations, data managed or used by an application may also be provided when offline, possibly through the use of a local store such as the exemplary local data store 134. For example, such a local data store may hold all or at least some subset of the information or data associated with an application. In the example of an email application, a local data store might hold, again without limitation, some or all of a user's email messages. In some implementations, when an application is used in an offline mode, the application may access data using the local data store instead of a remote data store like the server's data store 154. In some implementations, the data in a local data store may be synchronized with the data in other data stores. Through such a synchronization, for example, a change to data made when offline and initially stored in the local data store may be communicated to a remote data store so that the change is also reflected in the remote data store. In some implementations, such synchronization may be accomplished or performed, at least in part, by an operating environment—for example, the operating environment 130 may synchronize data between the local data store 134 and the data store 154. Use of an application in an offline mode or with locally-stored information is described elsewhere herein in more detail, for example with reference to FIG. 5.

Data may be represented within any particular store, in memory during execution, and during synchronization in a variety of ways. In some implementations, application data may be represented as a series of items or using lists of items. For example, in an email application, application data might include a list or series of items, perhaps called "emails," where each item represents an email message. An email application might also have lists representing other concepts or relevant data, such as a list for all contacts, a list for folders or tags with which an email message might be associated, and so on. Each list might in turn be represented using a variety of formats. For example, in some implementations a list might be represented, at least at some particular times, as a feed of data using a format such as the Atom feed syndication format or the RSS feed syndication format. In some implementations, a collection of data feeds, as well as possibly additional information—like ownership/access permissions that define the user or users that can read the data, or that can write the data, and so on—may be referred to as a "mesh object." In at least some of such implementations, one or more mesh objects—that is, again, one or more feeds of data items—may be associated with particular applications or with particular application packages (they might be specified in an application manifest, for example). So, an email application might define a mesh object that includes an "email" or "emails" data feed, a "contact" or "contacts" data feed, and so on. Each instance of the email application, then, might have instances of each of the defined mesh objects. For example, when a single user is associated with an instance of an application—when the application is not shared, as explained below—then the user might have an instance of each of the defined mesh objects and of each or particular data feeds associated with the mesh objects. Another user might have their own separate instance of each of the application's mesh objects. In some implementations, some of an application's data may be considered "private," in that it is not shared with other users, even when the application generally is shared or when other application data is shared with other users.

Further, application data, regardless of format, may also be synchronized using one or more of a variety of mechanisms depending on a variety of characteristics including the nature of the information, the topology of the devices that synchronize data, and so on. In some implementations, synchronization techniques that operate on feeds of data may be useful. In the same or other implementations, synchronization techniques that are capable of working in a mesh topology, or without a single central or master source for the data, may be useful. One such technique that provides for feed synchronization in a mesh topology where a variety of devices or synchronization endpoints can modify data is the "FeedSync" protocol developed by Microsoft Corporation. When used with mesh objects or data feeds, FeedSync might be used to synchronize application data by synchronizing mesh objects between devices—that is, by synchronizing the data feeds that are defined for each mesh object. When some entity modifies an item in a data feed, adds a new item to a data feed, or makes some other change to application data, that change may be synchronized between devices associated with the user using FeedSync. (In some implementations, that change might also be synchronized with devices associated with users with which the application instance is shared.)

In some implementations, a user may use an application, including those embodied or distributed in application packages, through an application such as an application viewer 140. Generally, an application viewer may be an application that provides access to one or more other applications. For example, an application viewer may interact with the operating environment 130 and the local web server 132 to obtain an application user interface and may then display the user interface and enable a user to interact with the application (possibly resulting in additional requests to the local web server, changes to the local data store 134, and so on). In some implementations, including those where applications are represented as described above, with HTML pages, CSS stylesheets, and so on, an application viewer may be implemented, in part, through the use of an "HTML control," "web control," or other executable code that includes functionality related to at least some of retrieving, displaying, and enabling interaction with HTML pages and other web resources.

Such an application viewer, and other application viewers, may also at least in some examples provide additional functionality that may not be included in many web browsers. For example, an application viewer might enable richer interaction with the client operating system or windowing environment—perhaps through enhanced support for an operation like drag-and-drop—or might provide functionality that would otherwise only be available in a general-purpose browser through the use of browser extensions, plug-ins, expansion controls, or the like. (In at least some implementations a user may not use a specific or specialized application viewer and may instead access an application, even when offline, using other means, such as through the use of a generic web browser.) Application viewer applications are described in additional detail elsewhere herein, including with reference to FIG. 8.

In some implementations, including those where a particular user may use more than one computing device, it may be possible to use an application in online and/or offline mode from or on more than one device. For example, suppose that in one example user device 110 is a desktop computer in a user's office, that user device B 160 is a laptop computer that the same user carries home, and that user device C 170 is the user's mobile phone. In such an example, or in many other cases, it may be possible for the user to use the same or a similar application, and the same or similar application data, on some or all of his or her computing devices. In this specific example in more detail, and without limitation, the user might obtain an application package 162 on user device B—that is, on their laptop—for the same application that is represented by the application package 120. In some cases at least, the application packages used on both devices may be identical. The operating environment 164 on user device B may also ensure that some or all of the data associated with the application is synchronized to user device B and stored locally. As a result, the user may be able to use the application—including possibly adding new data and modifying or deleting existing data—from their laptop, even when the laptop is disconnected or does not have network connectivity. They may do so in some implementations using one or both of the application viewer 166 and the web browser 168. At some point after such a change is made, when the laptop has sufficient network or other connectivity, the change may be synchronized with some or all of the other devices on which the application is used. For example, the change may be synchronized through the server 150 to the data store 154. The change may also or instead be synchronized to the local data store 134 on the user's desktop computer—user device 110 in this example—possibly through the use of the operating environment 130. In some implementations, the change may be made to one or more data feeds or mesh objects that may comprise some or all of the application data. In the same or other implementations, the change may then be synchronized between devices through the synchronization of one or more data feeds or mesh objects. (In some implementations, the change may be synchronized first with a particular or possibly central or master computing device, while in other implementations the changes may be synchronized in a mesh, including with a variety of endpoints in an arbitrary order.)

Continuing with the same example introduced in the previous paragraph, the user may also be able to access the same application and related application data through yet other devices, including, for example, the user's mobile phone or other device, which in this example might be user device C 170. As shown, the mobile phone in this example does not include an operating environment, and so may not be able to provide functionality that might enable offline use of the application, like a local web server or local data store. However, the mobile phone may include a connected application such as a web browser 178, and through the use of such a connected application a user may request application pages (and data) from a remote web server. That is, for example, the user may use the web browser on their phone to request the application from a remote server, such as the server 150. While the user may not be able to access the application when the phone cannot connect to the remote server (at least in this specific example), when connectivity is available the user can at least access the same data they access on their desktop or laptop computers, and can make changes to the data that are then synchronized with the application instances on the user's desktop and laptop computers (the user may also be able to see changes made on the desktop and laptop computers). It should be noted that some mobile phones may have the capability to include an operating environment and so provide offline access to applications, and that some laptop or other computing devices may not have an operating environment (because an operating environment may not be installed, because an operating environment may not be available for the particular platform or operating system in used, and so on). Generally, in at least some implementations, applications may be used online or remotely through a web browser or other connected device and may when possible—such as when functionality like that included with an operating environment is available—instead or also be used offline or locally.

In some implementations, applications as well as data associated with those applications may not only be shared between devices associated with a particular user, but may also be shared between different users and devices associated with different users. In such implementations, for example, suppose that two users use the same application—that is, they use the same (or similar) application user interface and the same or similar application executable code. They may do so by, for example, using the same application from the same server (or from different servers that provide the same application), by using the same application package, or through other means. However, "using the same application" may not typically mean that they use or have access to the same data. However, in some cases, sharing the same data may be desirable. As just one of many possible examples, consider the case where two users have a to-do list with tasks that both users may perform. In such an example, and in some implementations, it may be possible to share both the application—for example, by using the same or similar application package that implements the user interface and executable code for the to-do list application—as well as specific instances of the application data, which might in this example be a list of tasks, perhaps with due dates, start dates, and so on. In such an example, a second user might use the other user device 180. In a similar fashion to how the application package and application data was communicated to the user device B 160, as described above, the to-do list application and data may be communicated to and stored on the other user device. The other user may then be able to view the same tasks that the first user sees (as well as changes made by the first user), and may also be able to add, update, or delete tasks, and have such changes synchronized with the first user. In at least some implementations, application data may be communicated or synchronized between users and between devices associated with users through the use of data feeds or mesh objects and data feed or mesh object synchronization. Application and application data sharing is described herein in more detail, with reference, for example, to FIG. 6.

In addition to using applications in both online and offline modes, and sharing data between a user's devices and between the devices of different users, in some cases it may be desirable to enable access to application data from contexts outside of the application itself. For example, suppose a particular application enables a user to manage a "wish list" of products or gifts the user might like to obtain. Many e-commerce web sites provide such functionality today, but a user typically has to access the web site in order to view their wish list or to make changes to their wish list. An e-commerce vendor might make an application package available that enables a user to view and change their wish list. A user might then be able to use the application provided by the application package when offline and, at some point, synchronize any changes with other devices, including with a remote server, such as with the server 150. However, even with such an implementation, the application data viewed and changed by the user may not necessarily be incorporated into or accessible from the e-commerce site itself, at least not possibly without additional steps.

Stated generally, an external entity—such as a web site (or other executable code, including executable code that exists outside the context of a web site)—may be represented as an external server 190. Such an external server (or many external servers) may, for example, provide a web site and so display data and accept requests or user input—possibly through the use of one or more web servers, such as the exemplary web server 192—and may store data—perhaps through the use of the data store 194, or other data stores. Functionality associated with such an external server, or generally with any external code that exists outside of the context of an application, may in some implementations interact with one or more devices that include or exchange the previously introduced or other application data. Continuing with the wish list example, an e-commerce web site, which might be represented by the external server 190, might interact with the server 150 (or one of the other devices that store application data) in one or more of a variety of ways and obtain changes to the application data created or modified using the wish list application. After retrieving these changes, the external server 190 might then store or display such changes on the e-commerce web site itself, or might use changes in any of a variety of other ways. In the other direction, a change to a wish list made on the e-commerce site might be "pushed" or incorporated into the application data associated with the wish list application, and so be visible (and capable of being modified) from within the wish list application. In some implementations, an external server or external executable code may read and/or write application data in a data store, such as the data store 154, while in the same or other implementations some or all of application or other data may be synchronized between two or more stores, including between the exemplary data store 154 and the exemplary data store 194. In some implementations, such synchronization may be performed using a synchronization technology such as the FeedSync protocol introduced previously. Access to data from an external context is described in more detail elsewhere herein, including with reference specifically to FIG. 9.

It should be further noted that the external server 190 generally may represent any functionality that is logically or physically located outside of the context of an application and the application's associated application data, and is only shown as an external "server" with a web server and data store for the sake of introduction and ease of explanation. Any external executable code or functionality—including functionality that is a part of non-server computing devices or functionality that is not associated with one or both of a web server or data store—may have the capability of, for example, accessing application data as introduced previously and may use techniques described herein with reference to an external server or external code.

It should also be noted that while one of the container or viewer applications described in this example is referred to as a web browser 144, for the sake of discussion, that the container or viewer application is not limited to and does not necessarily need to be a web browser, and may in some implementations be one or more of a variety of other applications that may communicate with the server 150. For example, in some implementations, a web browser (including the web browser 144 as well as the other web browsers shown in FIG. 1) may be embodied or included in some other application; in the same or other implementations, the web browser may communicate with a server using protocols or communication means not typically associated with a web browser, including non-HTTP protocols. In a somewhat similar fashion, elements such as the web server 152 and the local web server 132 (as well as the other web servers shown in FIG. 1) may in some implementations provide some other type of server or peer connectivity functionality aside from that typically provided by a web or HTTP server. For example, in some implementations a web server 152 may communicate using non-HTTP protocols. Also although in some implementations the application used by the user associated with the user device 110, and provided by the server, may be a "web application" and be comprised of, among other things, web pages, CSS stylesheets and other presentation information, a variety of server-side and/or client-side executable code, and so on, the application does not necessarily need to be implemented in such a way, and may use other techniques or technologies for developing and distributing applications. Such other techniques might include, for example and without limitation, "rich internet application" techniques such as those provided by the Silverlight product produced by Microsoft Corporation, or the AIR product produced by Adobe Corporation of San Jose, Calif.

Figure 2:
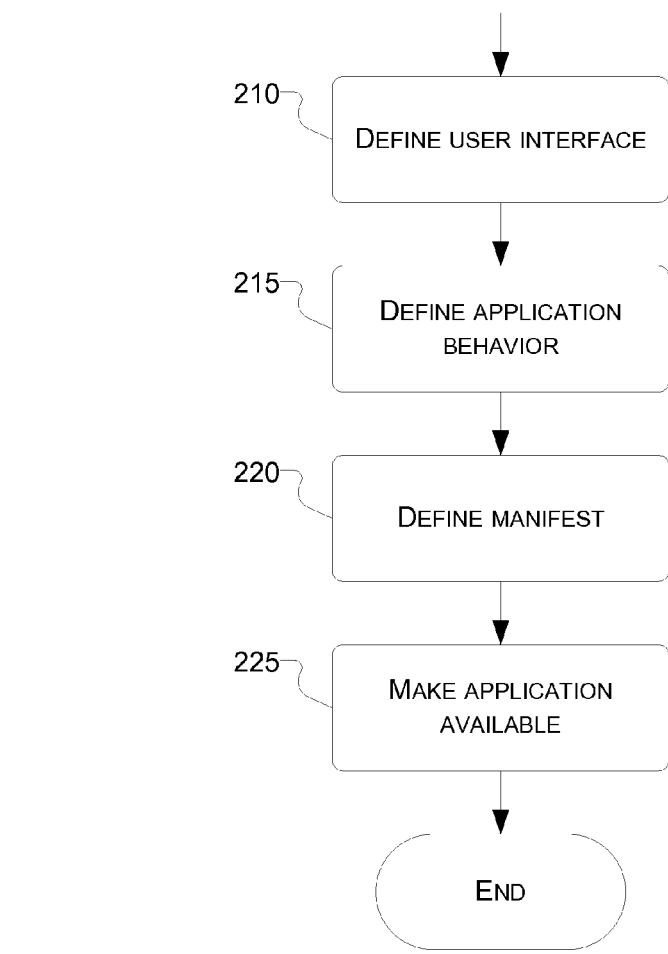
FIG. 2 illustrates an exemplary generalized operational flow including various operations that may be performed when developing an application for use in online and/or offline modes.

Turning now to FIG. 2, shown therein is an exemplary generalized operational flow 200 including various operations that may be performed when developing an application for use in online and/or offline modes, as described herein. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 210, a developer may define a user interface associated with an application. The method by which the user interface is defined may depend, among other things, on the technologies being used to create the application. In one example, the developer might define one or more HTML pages along with one or more CSS stylesheets. The resulting styled pages might then form at least part of the user interface for the application. In another example, the user might create the user interface using one or more of a wide variety of other user interface definition languages or techniques, including XAML or XUL.

In one implementation of operation 215, a developer may define the behavior of the application by writing executable code. The actual behavior resulting from the execution of the code of course varies depending on the nature of the code and the purpose of the application. Such executable code may be written using a wide variety of languages. For example, the executable code for applications that are designed to be viewed or used from a web browser (or other browser-like container, such as at least some of the application viewer applications described herein) may be written using JavaScript or some other language that typically can be interpreted or executed by a web browser or similar application. When the user's browser, or other application, displays the user interface defined at least in part in operation 210, the same application may execute at least some portion of the executable code defined, in JavaScript perhaps, in this operation. More specifically, in just one example, when a user clicks a button on a web page, executable code associated with the clicking of that button may be run by the web browser or other container application.

In some implementations, executable code may use one or more libraries or other provided code as part of implementing particular operations. As just one example, an application might use a set of provided executable code when accessing application data. Such provided code may enable, for example, the application to perform the so-called "CRUD" operations: to create new application data, to read existing application data, to update existing application data, and to delete existing application data. In implementations that use lists or feeds of data items, or mesh objects, the data access code may enable an application to operate on a list or set of data or on a single data item in a list. While data access operations may be implemented in a variety of ways, in some implementations they may be implemented at least in part by causing the web browser or other application to submit an HTTP request using the particular corresponding HTTP verb—so that, for example, to read data the browser submits a GET request, to add a new data item or change an existing data item the browser submits a PUT or POST request, and to delete data the web browser submits a DELETE request. In at least some implementations, such data access methods may operate in a similar or the same fashion regardless of whether the application is running in an online or offline mode, as will be explained in more detail elsewhere, including below with reference to FIG. 4 and FIG. 5. (In some implementations, the application may provide or implement similar instructions itself—that is, an application may not use predefined code for such operations.)

It should be noted that in some cases some or all of the user interface may be defined by the execution of executable code, and it may also be possible in some implementations to define interactive behavior through the use of user interface technology. As a result, operation 210 and operation 215 should not necessarily be considered to produce absolutely discrete instructions in every single implementation. Furthermore, it is likely that in many implementations operation 210 and operation 215 (and possibly also operation 220 and operation 225) may be performed iteratively and repeatedly before the development of an application is finished or complete.

In an exemplary implementation of operation 220, a developer may define an application manifest. As introduced previously, such a manifest may identify or include references to the files (or other units of data) that comprise the application user interface and the application's behavior. Such manifests may also include application metadata such as a name for the application, identifying information for the author or distributor of the application; a specification of the data used by the application—perhaps defined, in some implementations, by identifying data feeds or mesh objects that comprise the application data for the application; whether the application may be shared with other users; as well as a variety of other configuration information or metadata related to the application or to other settings or information.

Finally, in at least some implementations of operation 225, the application may be made available for use. The manner or manners in which this operation is accomplished may vary depending on a variety of characteristics, including the nature of the application; the technologies used to define the application—such as those used to define the user interface and executable code; the distribution mechanism or mechanisms to be used with the application; and so on. In some implementations, an application package may first be created for the application—a developer might, for example, use a tool or utility to group and possibly compress the files, perhaps defined using the manifest, that comprise the application, into a single file, as has been previously discussed with reference to FIG. 1. Such a file may then in some implementations be transferred to one or more of a variety of locations, including servers from which potential users can examine and download the application package, as will be described in more detail below with reference to FIG. 3. In some implementations, a developer or application distributor may take additional steps, perhaps as part of providing the application to be hosted on some other site that they do not control, for example—they might register with the other site, provide contact information, describe the application, and the like, and upload the application package. The application might then be listed in an application directory or application catalog that a user can then use to locate and download the application. In some implementations, the developer or distributor of an application may be able to obtain information related to or associated in some manner with their application, such as data about how their application is being used. For example, a developer or distributor might be able to determine information such as how many times their application has been downloaded or obtained, information about the number of users using their application, in some cases information specific information about one or more users of their application, as well as perhaps a variety of other information.

In some implementations, a developer may be able to update an application that was previously made available for use and have the application updated for some or all of the users that use the application. For example, a developer might update or change one or more of the application manifest, the application user interface, the application executable code, and so on, and perhaps generate an updated or new application package that includes the change or changes. The developer might then make the updated application available for use, perhaps as described previously. In some implementations, the changes or updates may be distributed or used by current or new users of the application in one or more of a variety of ways, including through mechanisms described elsewhere herein in more detail, including with reference to FIG. 7 below.

Figure 3:
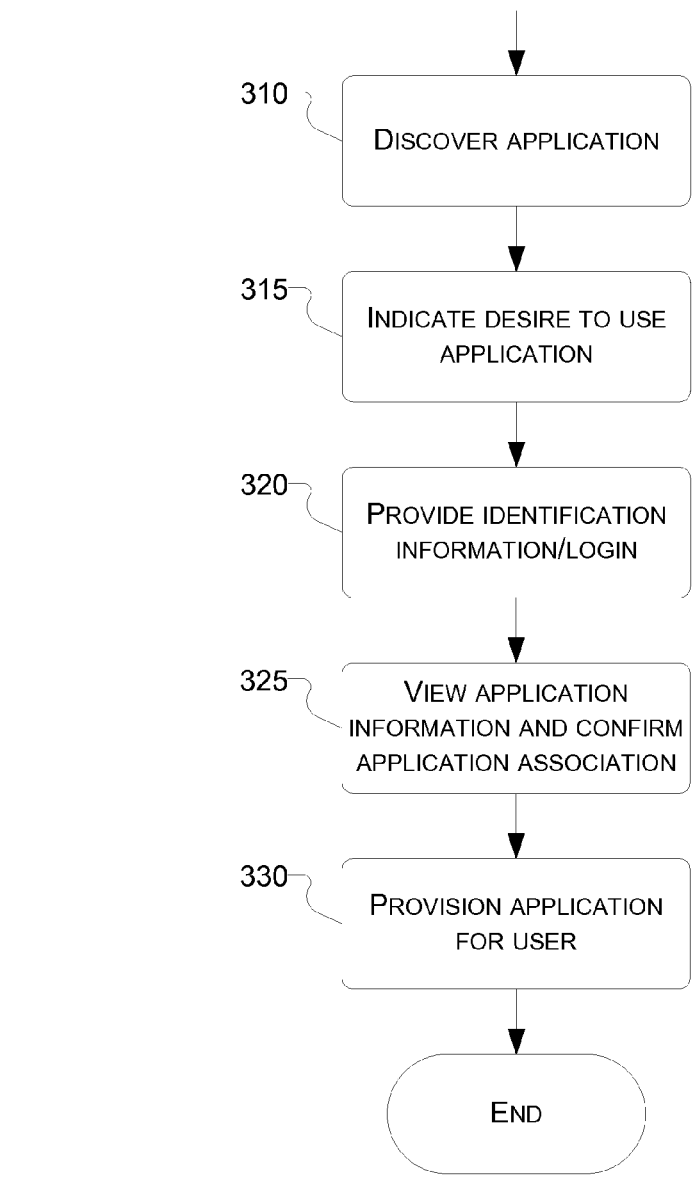
FIG. 3 illustrates an exemplary generalized operational flow including various operations that may be performed as part of a user indicating a desire to begin use of an application and as part of provisioning or setting up an application for use by a particular user.

Turning now to FIG. 3, shown therein is an exemplary generalized operational flow 300 including various operations that may be performed as part of a user indicating a desire to begin use of an application and as part of provisioning or setting up an application for use by a particular user. The following description of FIG. 3 may be made with reference to other figures. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 310, a user may discover an application that they desire to use. They may search for an application to suit a particular purpose in some kind of application catalog, visit a web site or see a communication advertising an application, receive an invitation from another user, and so on. As part of one or more of these discovery mechanisms, the user may find a link to the application, where the application itself is provided somewhere online—as might have been accomplished, for example, as described previously with reference to, for example, operation 225 of FIG. 2.

In at least some implementations of operation 315, the user may indicate a desire to use the application discovered in operation 310. For example, the user may click a link associated with the application, or may provide some other affirmative indication or statement indicating that they would like to use the particular application. (In some implementations, after a user indicates their desire to use the application in operation 315, an application package may be downloaded to a device associated with the user and the user may be able to use the application locally on that device. Such use is explained in more detail elsewhere herein, including for example with reference to FIG. 5.)

In an exemplary implementation of operation 320, the user may be transferred to a web site or other location that they may use to prove or authenticate their identity, perhaps using a username and password or a variety of other authentication and/or identification mechanisms. For example, a user might be transferred to a Microsoft Passport/Live ID login page, or the like. This step may enable the application that the user has chosen to be associated with an identity, which may then, at least in part, enable other functionality that may use the identity of a user (such as synchronization of the application and/or application data to other devices owned by the user). In some implementations, applications for which an association with an identity is not needed or desired may not require the providing of identification information. In at least some implementations, a user may be identified implicitly through, for example, the use of previously provided identification information (through cached information associated with a particular web site, through credentials provided to and maintained by an operating system, or something else), in which case the execution of this step may not require user input.

In at least some implementations of operation 325, information associated with the application may be shown to the user, and the user may be able to confirm their desire to use the application, or decline. The information associated with the application and shown to the user may comprise a wide variety of information possibly including, in at least some implementations, one or more of the application's full name; a description of the application; some guarantee proving the identity of the entity distributing the application (perhaps using a certificate like that used during SSL communications, or through some other mechanism); whether the application will use local system resources and if so, which local resources—storage, peripherals, and so on—may be used; whether some or all of the data associated with the application may be accessible to other users or entities (including perhaps accessible by an external site or other executable code), and so on.

Finally, in an exemplary implementation of operation 330, the application may be provisioned or set up for the user. The various operations that may be performed as part of such a provisioning may vary depending on characteristics such as the manner in which the application is implemented, the way in which applications and/or application data may be represented and communicated between devices (or other users, or other entities), and so on. In some implementations, the application may be associated with the user identified in operation 320, perhaps by the modification of one or more data structures associated with the user—including, in some implementations, through the use of one or more data feeds or mesh objects associated with the user. In the same or other implementations, application data defined by the application—data feeds or mesh objects in some implementations—may be configured or initialized. In the same or yet other implementations, other steps may instead or also be performed as part of provisioning the application for the user.

Figure 4:
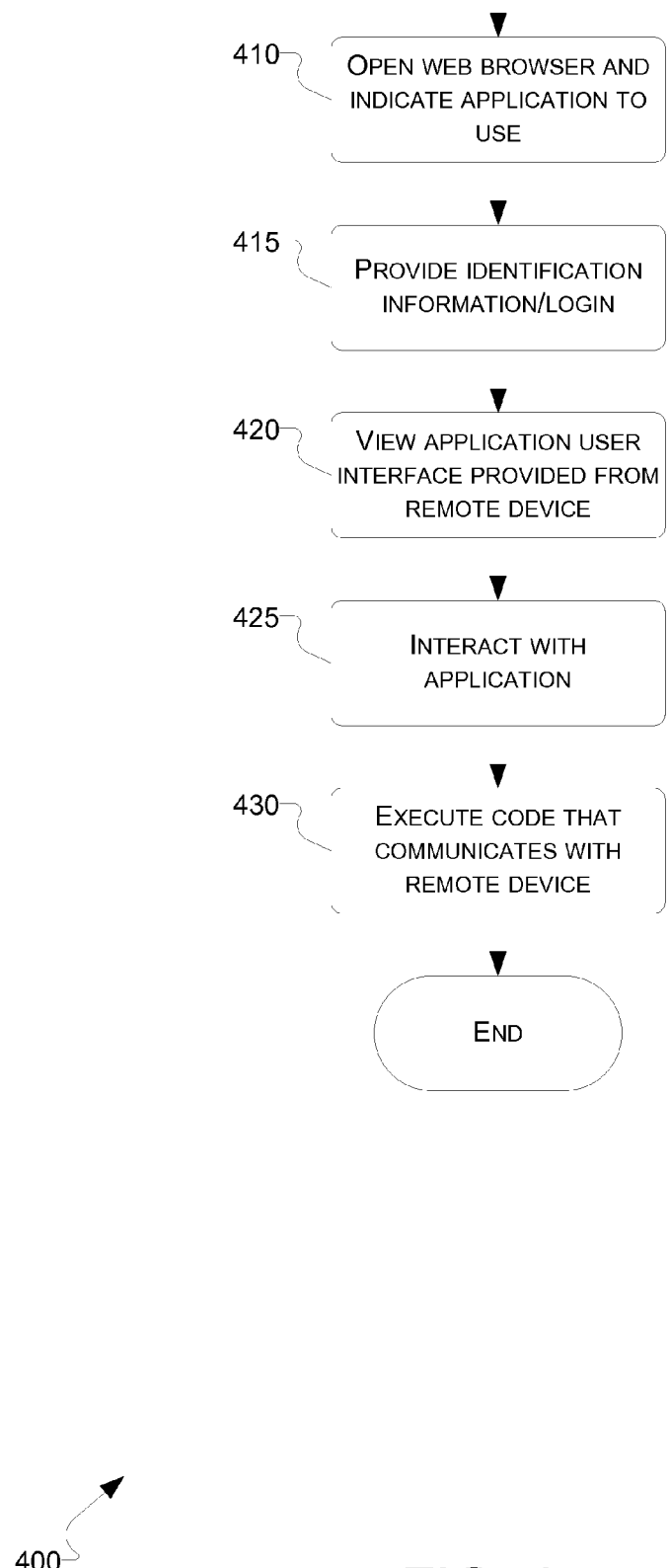
FIG. 4 illustrates an exemplary generalized operational flow including various operations that may be performed when viewing and interacting with an application in an online mode, or when the application is provided by a remote server and not provided from or by a local device.

Turning now to FIG. 4, shown therein is an exemplary generalized operational flow 400 including various operations that may be performed when viewing and interacting with an application in an online mode, or when the application is provided by a remote server and not provided from or by a local device. The following description of FIG. 4 may be made with reference to other figures. However, it should be understood that the operational flow described with reference to FIG. 4 is not intended to be limited to being used with the elements described with reference to these other figures. In addition, while the exemplary operational flow of FIG. 4 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 410, a user may open a web browser (or possibly some other application that enables the use of an application, as described elsewhere herein) and indicate an application to use. For example, a user might manually enter a URL into the web browser's address bar, might choose a saved bookmark or favorite, or specify an application in a variety or other ways.

In at least some implementations of operation 415, a user may authenticate or identify themselves. In some implementations this operation may be performed in the same way as or in a similar fashion to that previously described with reference to operation 320 of FIG. 3—through entering a username and password, using saved identification, and so on. Also as had been introduced previously, in some implementations this step may not be necessary and may not be executed.

In an exemplary implementation of operation 420, the user may view some or all of the user interface associated with the application. While this operation may be implemented in a variety of ways, in some implementations HTML instructions, CSS stylesheet information, and so on, may be communicated from a remote server to a user's device, and then such information may be rendered and displayed by the user's web browser, or other application. In implementations that use application packages, including those described elsewhere herein, at least some of the user interface information displayed as part of this operation may be obtained from an application package associated with the application.

In some implementations of operation 425, a user may interact with the application. Again, the ways in which this operation may be implemented or carried out may vary widely depending on a variety of factors including the way in which the application is implemented. In the case of an HTML application viewed in a web browser, a user might, for example, interact with the application by entering information into a text box or text boxes and perhaps clicking a button that indicates that the information should be associated with the application or saved, or the like. As just one specific example, with a to-do list application, a user might enter a new task and then click a button to save that task. Any of a wide variety of other interactions are also possible, including those that modify existing data.

Finally, in at least some implementations of operation 430 the user may cause executable code associated with the application to be executed. In some implementations, such executable code may be associated with an application package, as has been described elsewhere herein. For example, continuing with the simple example described in the previous paragraph, when a user enters information for a new task and clicks a button (or performs some other interaction) that indicates that the new task should be saved, that may cause executable code to be executed that results in the submission of a request or the communication of information to a remote server, including possibly the same remote server from which the user interface and application was provided. In response, the remote server may take whatever action or actions are needed to implement the request. In this specific example, the remote server might create a new entry in a data feed that holds tasks, might create a new database record with the new task, and so on.

While in some implementations at least some of the code executed as part of this operation may be provided with the application, or may be executed from libraries distributed with or referenced by the application (including those described previously), it should be noted that the code executed as part of this operation does not necessarily need to be custom code provided with the application. The code may in some implementations at least be code associated, for example, with the web browser or other container application. For example, in some cases a user may be able to submit a request to a remote server using, say, an HTML link or HTML form and submit button combination, without the execution of any JavaScript contained in or referenced by an HTML page.

As has been previously introduced, in at least some implementations, as part of an implementation of operation 430 (or possibly other operations), a request, including a web request, may be submitted to a remote server. In general, a request may be understood to include both an address that identifies where the request is to be sent and possibly additional data or the "contents" of the request. A request may use a variety of protocols, including in some cases the HTTP or HTTPS protocols. For example, some HTTP requests may often take a form something like the following:

"<HTTP METHOD> <PROTOCOL>://<HOST>/<ADDITIONAL DATA>"

For example, a request to retrieve a particular page or file might look something like:

"GET http://servername.com/directoryname/filename"

In this example, the HTTP method is "GET" (in other examples it might be one of POST, PUT, or DELETE, or possibly other methods), the protocol is HTTP, the host or "address host portion" is "servername.com," and the additional data or "address additional data portion" is "/directoryname/filename." In some implementations, such a request may be routed or communicated to one or more remote devices or server computers identified by the host or servername.com identifier, possibly using standard HTTP and TCP/IP techniques in this example or other protocol implementations in other examples. Upon receipt by the computing device or devices associated with servername.com, the remote devices may respond to or execute particular operations depending upon the nature of the request. In this example, a remote web server might interpret the additional data portion as identifying a particular file, named "filename," in the directory named "directoryname," and might return the contents of the file in a response to this request. While the host portion of the address may generally identify one or more endpoints to which the request should be communicated (often in a standardized or common manner), the additional data portion of the address may generally be interpreted by a receiver of the request in a wide variety of ways. For example, in some cases the additional data may not refer to a file and may instead encode or include executable instructions to be performed by the receiving endpoint, and/or may include a wide variety of data encoded as part of the additional data (with HTTP such additional data may sometimes be referred to using terms such as "query string parameters").

With at least some requests, for example with GET requests, the actual contents of the request—as opposed to the address—may be empty. In other examples, such as commonly with POST or PUT requests, the contents of the request may include additional information or data associated with the request. For example and without limitation, in some implementations, a POST request may be generated and submitted when a user submits a form from a web browser—in such an example, the contents of the web request may include information that was entered into the form.

While in some implementations of operation 430 a request may be submitted to a remote server, in a similar operation 535 as described below with reference to FIG. 5, substantially the same request may be submitted to a local server, such as a web server on the device that also displays the user interface. Also as described below, such a request may in some implementations be identical to the request submitted as part of some implementations of operation 430, except for possibly the host portion of the address. That is, for example and in some implementations, the additional data portion of the address and the contents of the request may be the same regardless of whether the request is being submitted to a remote device or server, as described with reference to FIG. 4, or is being submitted to a local server, as described below with reference to FIG. 5.

Furthermore, the host portion of the address is in many cases defined by the web browser or container application and is not in the control of the page or application being hosted. That is, for example, a web page or application may change or affect the additional data portion of the address (by setting query string parameters, for example) or the contents of the web request (using HTML form elements, for example), but the web page or application may not with at least some operations affect or change the host portion of the address. Instead, the host information may generally be controlled by the web browser or container application—typically it may be derived from the location from which the page was retrieved, for example—and included automatically with any additional data included with the address or in the request contents. That is, if a page is retrieved from "servername.com," the host portion of requests originating from that page may often be automatically set to "servername.com." Because the host portion may be defined by the location from which the web page or application itself may be served, and may not be under the control of or at least changed by the web page or application, executable code associated with the application may in some cases not need to change at all when the application is used online or from a remote web server instead of being used offline or from a local web server. Requests from applications used in offline mode are described in FIG. 5 below in more detail.

Figure 5:
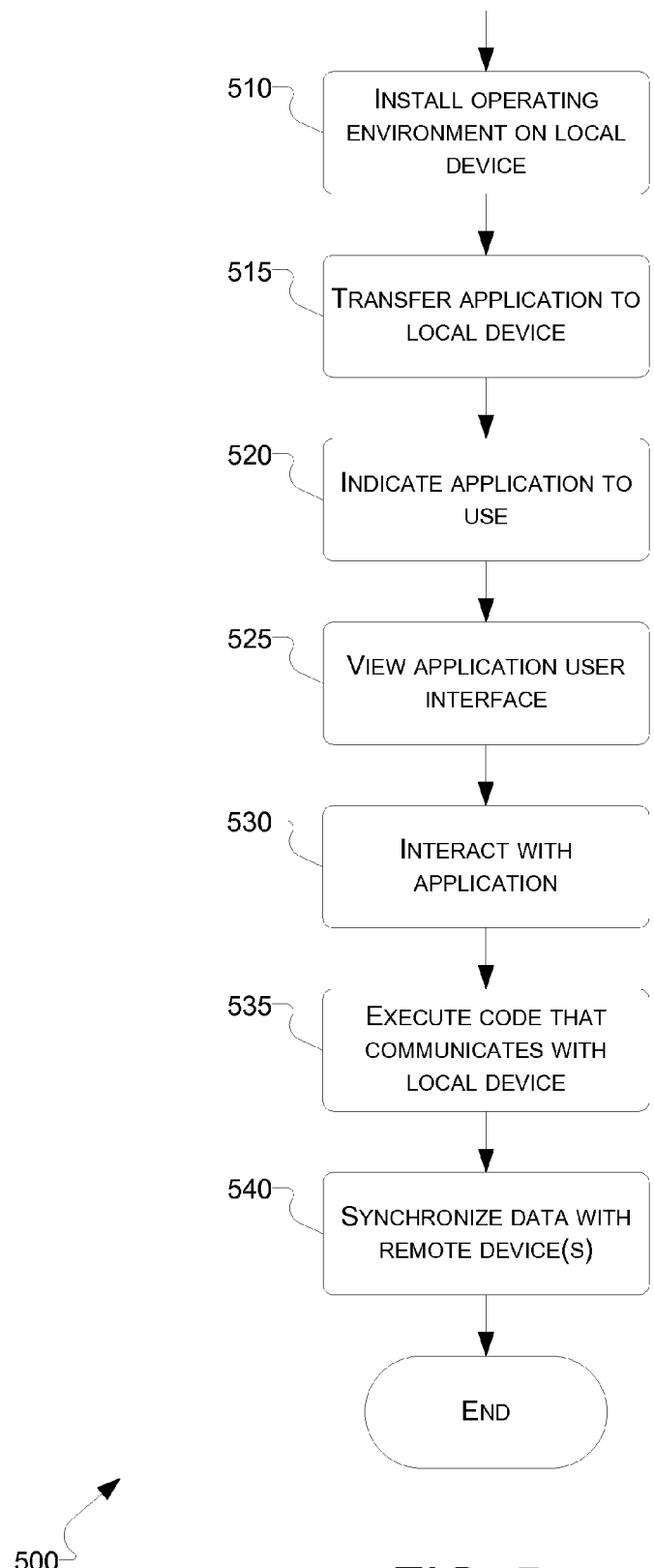
FIG. 5 illustrates an exemplary generalized operational flow including various operations that may be performed when viewing and interacting with an application in an offline mode, or when the application is hosted or provided by a local device and without requiring the direct use of a remote server.

Turning now to FIG. 5, shown therein is an exemplary generalized operational flow 500 including various operations that may be performed when viewing and interacting with an application in an offline mode, or when the application is hosted or provided by a local device and without requiring the direct use of a remote server. The following description of FIG. 5 may be made with reference to other figures. However, it should be understood that the operational flow described with reference to FIG. 5 is not intended to be limited to being used with the elements described with reference to these other figures. In addition, while the exemplary operational flow of FIG. 5 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 510, a user may install an operating environment on a local device on which they would like to subsequently use an application. In this context, the operating environment may comprise supporting or general code used to provide one or more applications in an offline mode. In some implementations, such an operating environment may be the same as or similar to the operating environment described elsewhere herein, for example with reference to FIG. 1. In at least some of these implementations, and also in other implementations, the operating environment may include, among other things, a local web server—that is, a web server that runs on the local device. The operating environment may also provide the ability to store data locally in one or more different ways, such as through the use of a local database, using an ability to read and write files on the local device or to use other storage (such as isolated storage provided by the web browser or some other part of the local device). In some implementations this installation operation may only need to be performed once, regardless of the number of applications that may be viewed or used locally.

Importantly for at least some use cases, and in contrast to at least some similar technologies, in some implementations the installation of the operating environment may not require elevated privileges. That is, for example, a user may not need to have administrative privileges, root privileges, or the like, to install the operating environment. In some implementations this may be accomplished by implementing the operating environment, including possibly the local web server, the local data store, and any or some other parts of the operating environment, in ways that do not require the execution of operations that require elevated privileges. For example, the web server may operate relatively independently from the browser, and not require the installation of, for example, a browser extension, "plug-in," "protocol handler," or the like that may require elevated privileges. As a result of not requiring elevated privileges, a larger number of users may be able to use such an operating environment and to access and use applications in an offline or disconnected mode.

In an exemplary implementation of operation 515, the application a user desires to use may be synchronized or otherwise transferred to the local device. For example, in implementations where an application can be contained in an application package, as part of this operation the application package may be transferred to the user's device. In some cases when a user subscribes to or has an application provisioned for their use—including through operations described previously with reference to FIG. 3—that application may be automatically communicated to at least some, and possibly to all, of the devices with which the user is associated and on which a suitable operating environment is installed. As a result, when the user next uses a particular device in an offline mode, the application (or applications) may already be ready for use with no further wait or work. In the same or other implementations, a user may specifically choose which applications should be made or kept available for offline use. The manner or manners in which the application may be communicated to a device may vary, and may include transfer of a compressed or archive file using a variety of protocols, transfer of one or more individual files or other blocks of data, and any other mechanism by which the components of the application may be communicated. In implementations that include the ability to synchronize application data—including as described elsewhere herein, such as with an operation like operation 540 described below—some or all of an application or application package may be transferred to a local device using the same synchronization mechanisms used to transfer application data. As just one specific example, it may be possible to represent an application—including files and resources associated with the application—using one or more data feeds or mesh objects, and to synchronize such application data feeds or mesh objects between devices using a synchronization protocol such as FeedSync. After the application has been transferred and stored on the local device, it may not need to be transferred again (or at least until the application is updated or changed, perhaps). In some implementations when an application has been received on a local device, it may be added to a menu of applications that are available for use locally without a remote server, may have an icon or other visual or other indication added to typical locations such as "start" menus, and so on.

In at least some implementations of operation 520, a user may indicate an application to use in an offline mode. They may click or double-click an application icon, choose an application from a start menu, open a web browser or application viewer—including an application viewer such as those described previously, for example with reference to FIG. 1—and choose an installed application, or indicate an application to use in a variety of other ways.

In some implementations of operation 525, the user may view some or all of the user interface associated with the chosen application. The specific operations performed as part of displaying the application's user interface may depend on a variety of factors including the manner in which the application is implemented and the container or other application that is displaying the application. For example, in some implementations with a web application that uses HTML pages, perhaps similar to at least some of those applications previously introduced and described, and with an application viewer or web browser, the application user interface—in this case perhaps comprised primarily of HTML pages and possibly CSS stylesheets—may be requested from a local web server running on the device. Such a local web server may have been installed in some implementations as part of the operating environment installation described previously with reference to operation 510. In such an example, the application user interface may be provided and then displayed in an entirely offline manner, without the use of a remote server. At the same time, in at least some implementations, the application itself may be the same application as may be provided in an online mode from a remote server—when offline the pages, for example, may be provided by a local web server while when online they may be provided by a remote web server.

In some implementations of operation 530, the user may interact with the application. In at least some implementations such an operation may be similar in at least some ways to operation 425 described previously with reference to FIG. 4. A user might, for example, enter information into a text box or text boxes and then perhaps click a button that indicates that the information should be associated with the application, saved, or processed in some other manner. As just one specific example, with a to-do list application, a user might enter a new task and then click a button to save that task. Also as before, any of a wide variety of other interactions are also possible, including those that modify existing data.

In one or more exemplary implementations of operation 535, the user may cause executable code associated with the application to be executed. As with the previous operation 530, in some implementations at least, this operation may be similar in certain ways to operation 430 of FIG. 4, except that the interactions may result in requests submitted to an entity on the local device, such as a local web server, and not to a remote server. In some implementations, the executable code may be associated with an application package, as has been described elsewhere herein. For example, continuing with the simple example described in the previous paragraph, when a user enters information for a new task and clicks a button (or interacts with the application in some other way) that indicates that the new task should be saved, the interaction may cause executable code to be executed that results in the submission of a request or the communication of information to a local web server. In response, the local web server may take whatever action or actions are needed to implement the request, including storing or modifying data in a local data store. In this specific example, the local web server might create a new entry in a local version of a data feed that holds tasks, might create a new database record with the new task, and so on. As before, it should also be noted that the code executed as part of this operation is not necessarily custom code provided with the application—it may in some implementations at least be code associated, for example, with libraries referenced by the application, with an application viewer application, with a web browser, with some other container application.

As was introduced previously, especially with reference to the discussion associated with operation 430 of FIG. 4, a web request may include an address and the contents of the web request (the latter of which may be empty with at least some types of requests). In some implementations of operation 535, one HTTP request may take a form that is something like:

"GET http://localhost:8081/directoryname/filename"

In some implementations, this request may be submitted to a local web server listening at port 8081. The local web server may then respond to the request in a variety of ways including through the execution a variety of instructions or operations, depending on characteristics such as the nature of the request and the implementation of the web server. In this example, the local web server may identify the file named "filename" in the "directoryname" directory, and return the contents of the file in response to the request. As before, a variety of other requests, and a wide variety of possible implementations, may be provided by the local web server.

In some implementations, the request submitted as part of operation 535 may be identical, possibly with one exception, to the request that would be submitted if the application was being used in an online manner or against a remote server, as described previously with reference to FIG. 4. In these or other implementations, the host portion of the address may change (from identifying a remote server to identifying a local device), but the HTTP method of the request, the additional data portion of the address, and the contents of the request may not change. Also as described previously, because the host portion of the address is typically under the control of the web browser, container application, application viewer, or the like, all of the parts of the request under the control of the web page or application may be identical regardless of whether the application is being used in an online or offline fashion, which may enable the same application or application package to be used without change in an online or offline mode.

Furthermore, and in contrast to at least some existing technologies, it should be noted that in some implementations as described herein, the request may be received on a local device by a "full-fledged" web server. That is, the entity that receives and responds to the request may be a web server instead of some other entity that may have some but perhaps not all of the functionality associated with a web server. For example, in some other implementations, the entity that responds to a request may be implemented as a web browser "protocol handler" so that the entity may examine requests before they leave the web browser, may be a local "proxy" that stands in or acts as a server—including performing functions such as logging or displaying information about requests or responses, or might include functionality for caching particular HTML pages locally and then returning them to a requesting browser if the cache determines that the web browser cannot connect to a remote server. However, such implementations of protocol handlers, proxies, and so on, may not be full web servers in one or more of a variety of ways. They may not, for example, implement the HTTP protocol in the same way or to the same degree as a typical web server.

Also, it should be noted that in some implementations, including some of those described herein, that the determination of the location to which a request is submitted is made by the web browser, container application, application viewer, or other code associated with hosting the web page or application, and not by some intermediary. That is, for example, a request submitted by a web browser or application viewer may use a different host when the application is used in an online mode then it uses when the application is used in an offline mode. In at least some other technologies, a web browser or application viewer might always submit a request to the same host or address, and that request might be accepted at that address or intercepted and then redirected to a remote or local device depending on whether the application is to be used in an online or offline mode. However, while the web browser or application viewer may submit requests to different hosts depending on online/offline use, in at least some implementations and as described previously, the web page or application itself may not be aware of any difference between online or offline use, and may in fact produce an identical request—again, excepting the host portion of the address—regardless of online or offline mode. Stated differently, the techniques described herein may enable an application to be implemented using one code base and still work in both online and offline modes, without requiring the use of an intermediary or other redirection techniques.

Finally, in at least some implementations of operation 540, data may be synchronized to and/or from the local device. In at least some cases, this operation may only be performed when the device can connect to other devices with which the data will be synchronized—perhaps when the local device is connected to a network that enables connections to the other devices, or when the local device is connected directly to one or more other devices. As just one example, a change made as a result of a previous operation—such as perhaps a new item or record, or some kind of change to an existing record—may be synchronized to one or more other devices as part of the implementation of this operation. Similarly, changes made to application data on other devices may be synchronized or transferred to the local device, and may result in the updating or addition of data stored in a local data store on the local device. The manner in which this operation may be accomplished may vary depending, for example, on the way in which data is represented locally or in transit, the manner in which other devices can be or are connected to the local device, and other factors. In at least some implementations, including those where application data may be represented using lists or sets of items—including as data feeds or mesh objects—this step may be implemented, at least in part, using one or more of a variety of synchronization techniques that enable the synchronization of lists of data, including data feeds. As described previously, for example, the FeedSync protocol might be used to synchronize feeds of data between the local device and a variety of other devices. Such a protocol, or other synchronization techniques, may provide for the communication of new items, of changes to existing items (including deletions of existing items), as well as other useful synchronization operations such as the determination of conflicting updates and the like.

Depending upon factors including, for example, the topology of the devices associated with this application or with a particular user, a change made locally—for example as part of operation 535—may be synchronized in at least some implementations of operation 540 to one other device, or to many other devices. Such a change or changes may then in some cases be synchronized to yet other devices associated with the user, with the application instance, or with some other desired functionality (such as perhaps backup or access to application data). As a result, a change made locally may, after some period of time, be available on all devices associated with the user and may in some cases also be available on one or more shared or highly-available stores, such as a data store located in a data center (including, for example, the data store 154 described previously with reference to FIG. 1). In cases where the application data is being shared with other users, such a change might also be synchronized in such a way that it is available to those users, including through synchronization to devices associated with the other users.

It should be noted that even though some portions of an application may be communicated beforehand, stored locally, and then provided as part of the execution of the application without a remote server, that this does not necessarily mean that executable code associated with the application may not attempt to initiate or undertake communications with one or more remote servers, if connectivity to those or other servers is available. As just one example, an application may use application data synchronized or communicated to the device, but may attempt to retrieve potentially more up-to-date versions of that data if connectivity is available.

Furthermore, it should be noted again that many of the operations described herein as being performed in an "offline mode," may be performed in the same way even when a device has connectivity or the ability to access an external network or remote server. For example, a user may use an application as described with reference to FIG. 5—where the application is provided from a local server, where changes to data are, at least initially, stored in a local store, and so on—even when a user could use the application in an online mode, from a remote server. Among possible benefits, using the application locally may be faster or provide a better user experience than using the application remotely.

In addition, in at least some implementations, an operating environment may host or provide more than a single application, may store or have access to more than a single application package, or the like. As just one example, a user may have subscribed to or indicated a desire to use more than one application. In at least some of such implementations, these different applications may be isolated from each other. For example, in some or perhaps all cases it may not be possible for a particular application to access the data associated with another application (unless, in some implementations, such access is allowed by a user, for example), or even know the other applications that may be installed locally or provided by the operating environment.

Figure 6:
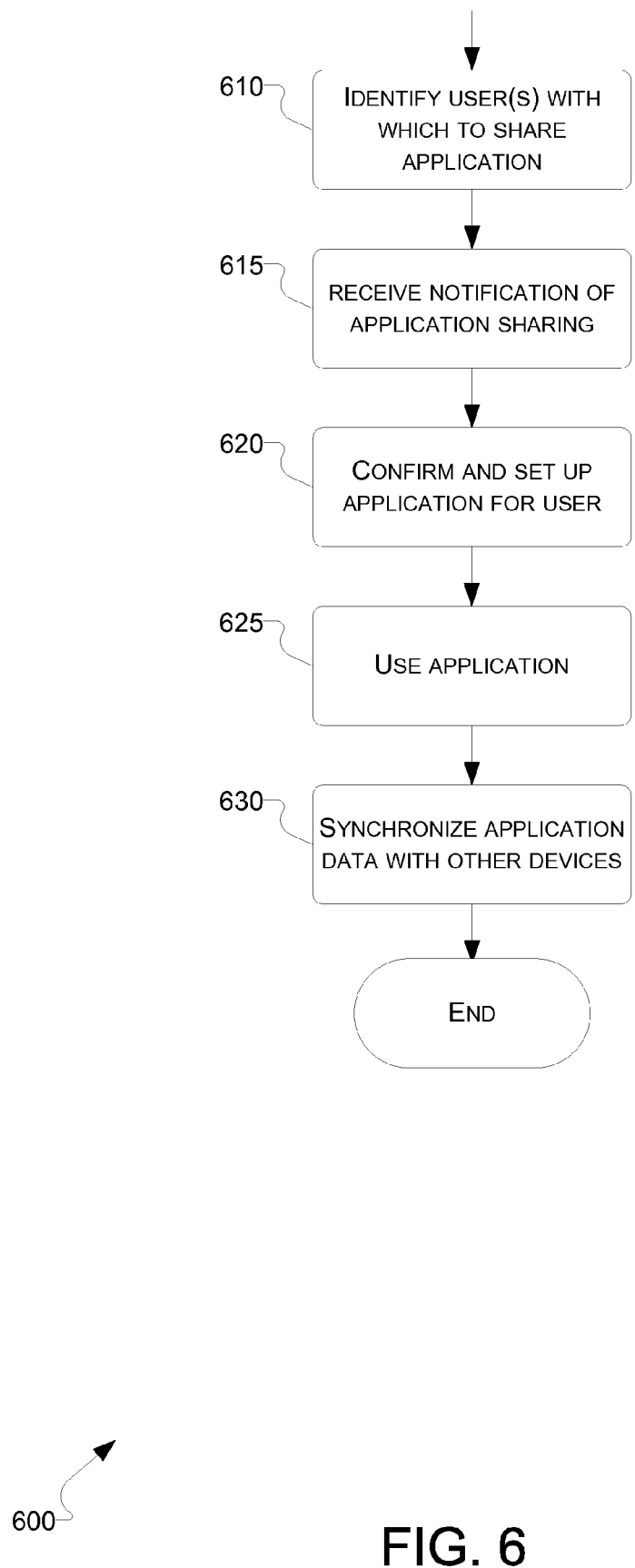
FIG. 6 illustrates an exemplary generalized operational flow including various operations that may be performed when sharing an application between users.

Turning now to FIG. 6, shown therein is an exemplary generalized operational flow 600 including various operations that may be performed when sharing an application between users. The following description of FIG. 6 may be made with reference to other figures. However, it should be understood that the operational flow described with reference to FIG. 6 is not intended to be limited to being used with the elements described with reference to these other figures. In addition, while the exemplary operational flow of FIG. 6 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

As has been mentioned previously, in some implementations applications may be shared between users. In contrast to at least some other techniques related to online and offline applications, in this context sharing of applications may include the sharing of application data for a particular instance of an application in addition to or instead of simply notifying or making another user aware of an application. For example, while a single user might use a to-do list application to manage tasks, in some implementations that same user might also share the application data associated with that to-do list application with one or more other users. In at least some of such implementations, multiple users may access and/or change data, and each user might then view changes made by others. In some cases this may be referred to as "sharing an application" or as "sharing an application instance," where the term "instance" may refer to a single instance of the data associated with an application, and where such data is communicated and shared between users, and between the devices associated with users. (It should further be noted that as used herein, the term "user" is not necessarily limited to a single person, for example. Instead, a user should be considered to be a single identity related to or associated with a system for developing and using online and offline applications, as described herein. In some cases a single person may have multiple identities and so be associated with multiple users while in other cases more than a single person might be associated with the same identity and so only have a single user in such a system.)

In at least some implementations of operation 610, a particular user may indicate a desire to share an instance of an application with one or more other users. The user might already be using or have an instance of a particular application, or might indicate a desire to share the application, perhaps, as part of the process of setting up or provisioning the application (including in some implementations as part of an execution of the operational flow described previously with reference to FIG. 3.) In some implementations of this operation, the user might indicate a user with which to share the application by entering an email address of another user, by choosing a user from a "friend" or "buddy" list, by choosing a user from a "contacts" mesh object, or the like.

In an exemplary implementation of operation 615, the user or users identified—perhaps as part of an implementation of operation 610—may be notified that another wishes to share a particular application with them. For example, a user might receive an email with such a notification, might see the request as part of a user interface associated with using online and offline applications or some other user interface, and so on.

In some implementations of operation 620, a user that received a notification may have the opportunity to confirm that they want to share the particular application or application instance with the user that sent the invitation. If the user provides such affirmative confirmation, the application instance may then be configured or set up so that it is shared with the user. In many ways some implementations of this operation may include at least some of the same operations described previously with reference to FIG. 3, including indicating a desire to use a (shared) application, possibly viewing information about the application, and confirming that the user wants to use application. The manner in which the application is provisioned for the new user may vary depending on characteristics such as the nature of the application and the way in which the application defines and uses application data. For example, in some cases provisioning the application for use by the additional user may involve changing the permissions on the application data already defined for the application so that the new user can view some or all of the application data, can make changes to some or all of the data, and so on. In the same or other implementations, additional application data may be defined as part of this operation. An application might maintain a change history or other user-specific data for each user, for example, and such data might be created for the additional user as part of this operation.

In at least some implementations of operation 625, the one or more new users that now share the application may view and use the application. In many implementations such use may be the same as or similar to that previously described for online use, with reference to FIG. 4, and to offline use, with reference to FIG. 5. The user may view an application user interface associated with the application and interact with the application to add new application data and change existing application data. Depending on how the application stores its application data, such changes may be made to, for example and without limitation, items in feeds of data, mesh objects, database records, and so on.

Finally, in an exemplary implementation of operation 630, changes made by the new user or users may be synchronized with other devices associated with the same new user or users, as well as with devices associated with other users with which the application is being shared. Such synchronization may be implemented in a variety of ways, including through the use of synchronization techniques as described previously including, in at least some implementations, synchronization techniques such as those that are part of the FeedSync protocol.

Figure 7:
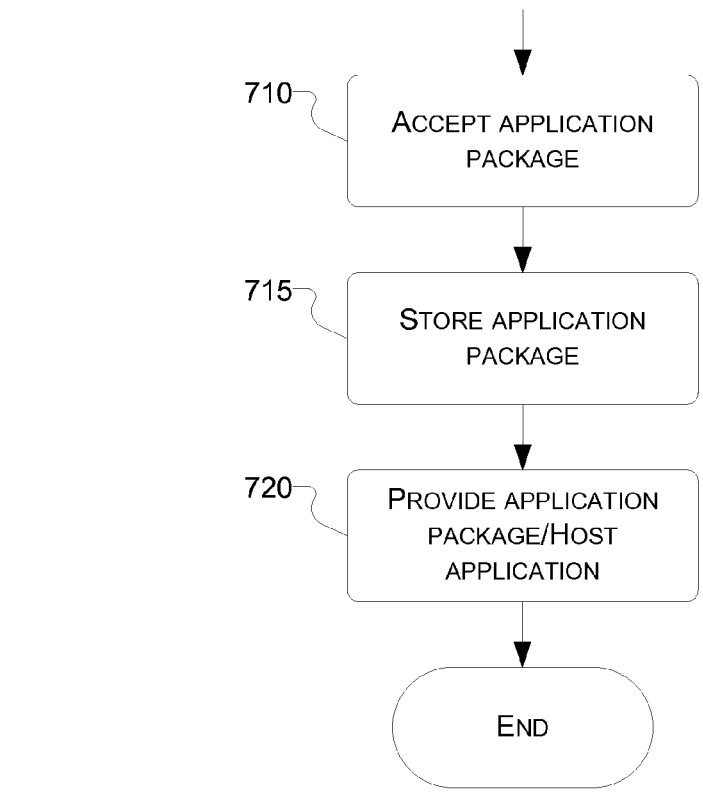
FIG. 7 illustrates an exemplary generalized operational flow including various operations that may be performed when accepting and providing or hosting an application or application package.

Turning now to FIG. 7, shown therein is an exemplary generalized operational flow 700 including various operations that may be performed when accepting and providing or hosting an application or application package. The following description of FIG. 7 may be made with reference to other figures. However, it should be understood that the operational flow described with reference to FIG. 7 is not intended to be limited to being used with the elements described with reference to these other figures. In addition, while the exemplary operational flow of FIG. 7 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In at least some implementations of operation 710, an application may be accepted so that the application can be stored, and/or so that the application can possibly later be provided or hosted. In some implementations, one or more computing devices, including server computing devices possibly located in a data center with other server computing devices, may accept an application by responding to a request or submission including some or all of an application sent by one or more other computing devices. In just one specific example, and without limitation, a developer or other entity may author an application—perhaps by following operations discussed previously with reference to FIG. 2, or through other means, may then create an application package, and may then upload or send the application package to the one or more computing devices that, at least in part, provide one implementation of operation 710. In at least some examples, the application package may be defined through the use of, at least in part, an application manifest, as described elsewhere herein. In some implementations, the application package may be communicated to the accepting computing device or devices using FTP, SFTP, HTTP, HTTPS, and so on, as well as any other mechanism by which an application package might be communicated. The manner in which the application package is accepted may then depend, possibly among other things, on the protocol or mechanism by which the application package is submitted—when HTTP is used, for example, a web server associated with one of the accepting computing devices may accept the request and receive the application package.

In an exemplary implementation of operation 715, the application package may be stored in some fashion. For example, if the application package is received in a data center that includes a number of servers as well as one more computing devices that provide data storage, the application package may be stored on one or more of such servers and/or storage devices. In some implementations, the application package may be stored in more than one location for the sake of redundancy, or so that it may be retrieved relatively more quickly, or for other reasons.

Finally, in one or more implementations of operation 720, the application may be provided to one or more computing devices.

In some implementations, the application package may be retrieved and provided, perhaps as a single file or as a set of files, to a requesting device. Such an implementation might be used when, for example, it is desired to use or run the application on some other computing device, where the other computing device, for example, stores the application locally. That is, in at least one specific example, and without limitation, the application package may be provided to some other computing device so that the other computing device can implement an operation such as the operation 515 previously described with reference to FIG. 5, where an application is transferred to a device and then provided locally from that device. In at least some of such implementations, the computing device or devices that provide the application package may need to do no more than return the same data or compressed/archived file that was provided in operation 710.

In the same or other implementations, a computing device may provide individual or particular parts or portions of the information in an application package, perhaps separately or independently from other parts or portions of the application package. This might enable the computing device or devices to "host" or provide access to an application without requiring that the entire application be transferred or provided to a requesting client, and/or without requiring that the requesting client have the capability to use the application locally in an offline mode (perhaps through the use of its own operating environment, local web server, and so on). In other words, because a computing device or devices may host an application as described in at least some implementations of operation 720, a client may be able to access the application remotely through no more than, for example, a web browser or other similar application. In doing so, in at least some implementations, one or more of operation 420, operation 425, and operation 430—all previously described with reference to FIG. 4—may be implemented by some other computing device by receiving particular parts of an application hosted by one or more computing devices. For example, in the case where an application package includes elements such as HTML pages, CSS stylesheets, and JavaScript code in separate files, at least some implementations of this operation may communicate individual HTML pages, CSS stylesheets, and JavaScript code to a requesting client and in doing so may "host" the application.

In some implementations, it may be possible for a developer or application provider to update a previously supplied or deployed application. For example, if one or more of an application's user interface, executable code, manifest, and the like, are changed or updated, an updated application package may be accepted and stored, perhaps in the same or in a similar fashion as has been previously described with reference to operation 710 and operation 715. Subsequently, when a user accesses the application, some or all of the updated elements of the application may be provided to the user; this may be accomplished through the use of mechanisms that are the same as or similar to those described previously with reference to operation 720, or through other mechanisms. In an exemplary implementation where a user makes use of an application package to, for example, use the application in an offline mode, the updated application package may be automatically or possibly seamlessly and transparently provided and perhaps synchronized to some or all of the devices in a user's mesh of devices, so that the user has access to the updated application their devices, without necessarily being required to perform any new or additional "installation" steps, or the like. In at least some implementations, such an update mechanism may ensure that the application is updated "atomically," in that either the original version or the updated version of the application will be usable, but so that a user won't be able to use an application that has been partially updated.

Figure 8:
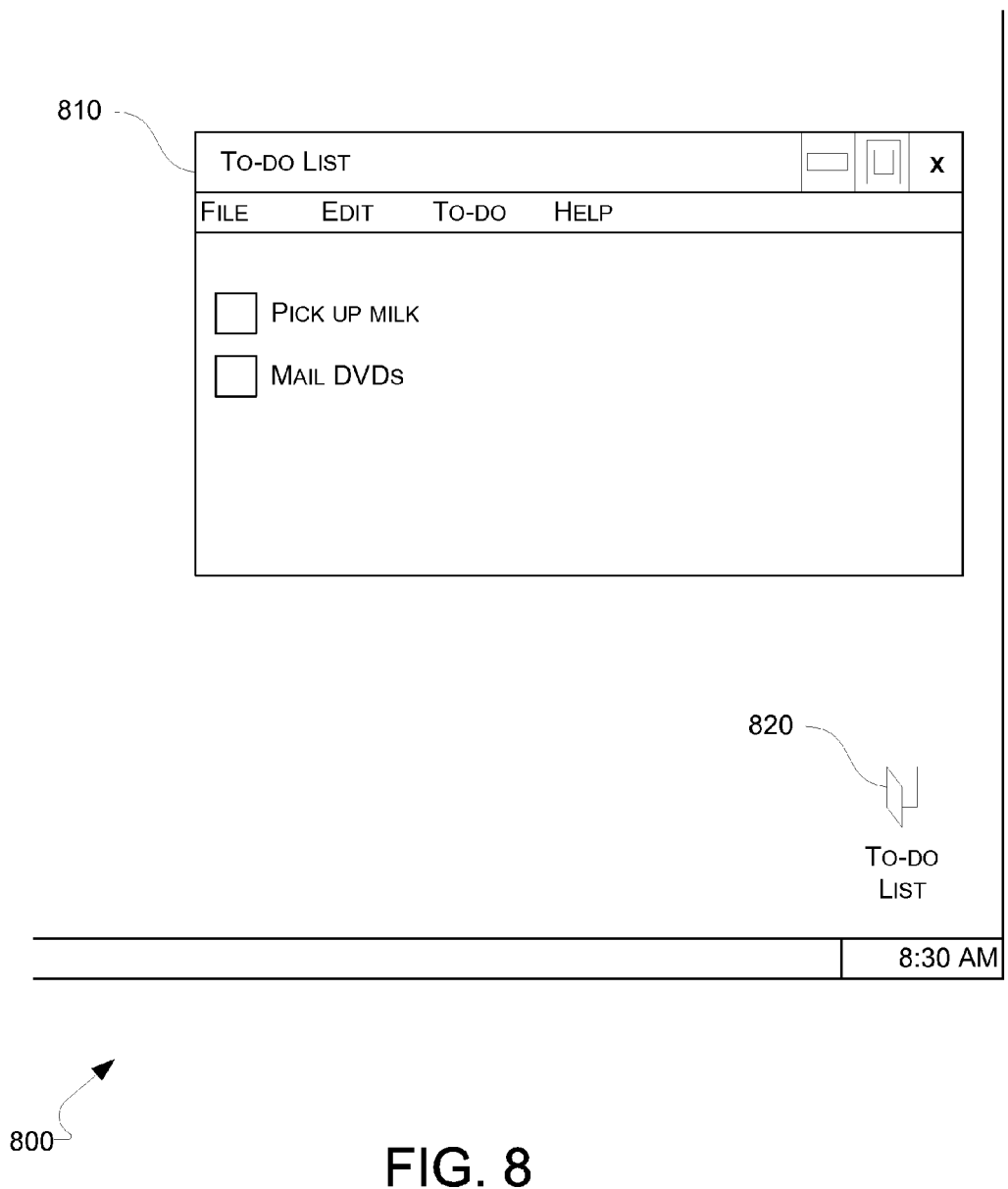
FIG. 8 illustrates an exemplary user interface that demonstrates one manner in which an application may be used on a computing device.

Turning now to FIG. 8, shown therein is an exemplary user interface 800 that demonstrates one manner in which an application may be used on a computing device. The exemplary user interface includes an exemplary application viewer user interface 810 and an exemplary icon 820 for the application displayed in the application viewer user interface.

The application viewer user interface 810 provides just one of many possible examples demonstrating how an application viewer might display and enable the use of applications. As has been introduced previously with reference to, for example, FIG. 1, generally an application viewer may be an application that provides access to other applications, including those applications described herein as being provided using application packages. Such an application viewer may in some implementations be installed as part of the installation of an operating environment (including an operating environment that also includes a local web server, and that may not require elevated privileges during installation). An application viewer may interact with an operating environment and possibly use a local web server to obtain an application user interface and may then display the user interface and enable a user to interact with the application.

While the application viewer may in some implementations accurately be described as a "container application," in that it may host or contain applications possibly communicated using application packages or through other means, to a user it may appear like any "normal" application in that it may not be readily apparent that the application they are using is different from a "stand-alone" or other application not hosted in some kind of container application. For example, in at least some implementations, applications displayed using an application viewer may have the same user interface "chrome" or elements—like menus, title bars, and so on—as non-container applications, may have the capability of modifying elements of the containing application viewer, and so on. As just one example of how an application viewer may appear like a normal application, and not a container, the exemplary application viewer user interface 810 includes a title bar with the text "To-do List," instead of something like "Application Viewer."

In some implementations, including those where applications use HTML pages, CSS stylesheets, and so on, an application viewer may be implemented, at least in part, through the use of an "HTML control," "web control," or other executable code that includes functionality related to at least some of retrieving, displaying, and enabling interaction with HTML pages and other web resources. For example, if the "To-do List" application shown in FIG. 8 is implemented using, among other elements, HTML pages, then in some cases the "Pick up milk" text, "Mail DVDs" text, the check boxes, as well as possibly other user interface elements (including those not shown) may be communicated using HTML information, and the application viewer may display such information using, in part, executable code that renders HTML information to provide a visible user interface. In some implementations, such executable code may be provided as part of a web browser application as, for example, an "ActiveX control" or using some other software component technology, and may therefore be accessible to other applications such as an application viewer as described herein. In the same or other implementations, an application viewer may have the ability to understand and display application user interfaces provided in a variety of other, and non-HTML, user interface technologies.

In some implementations, application viewers may also provide additional functionality that may not be available to HTML pages or web applications when hosted in a web browser or that are not included with at least a typical web browser. As one example, the exemplary application user interface 810 includes a menu with the text "To-do," demonstrating perhaps that the application hosted in the application viewer has the capability of adding to or controlling the menus in the application viewer; this is a capability that, for example, web pages displayed in a web browser typically do not have. In the same or other implementations, an application may be able to control or affect a variety of other user interface elements provided by the application viewer, including, for example, "tool bar" buttons, status bars, and so on.

The manner in which an application hosted by an application viewer may be started or initiated may vary. In some implementations, such an application may be associated with one or more typical user interface elements that a user might select, click, double-click, or the like. For example, a user might have an icon, shortcut, or the like, that might be displayed on a user's "desktop"—such as with the exemplary icon 820—or that may be included in a "start" menu or other list of applications. When a user selects, double-clicks, or otherwise interacts affirmatively with such an icon in one or more of a variety of ways, the application viewer may, in some implementations, be started and the application loaded and displayed.

In some implementations, an application viewer may also provide additional functionality to applications hosted or displayed by the application viewer, including functionality that might not have an immediately visible user interface and/or that may not typically be provided by applications such as web browsers. For example, an application viewer might enable richer interaction with the client operating system or windowing environment, perhaps through enhanced support for operations like "drag-and-drop." For example, in some implementations a user may be able to "drag" an image or a file, or some other element, and "drop" the element on to some portion of the application viewer user interface 810. Some representation of the dropped entity might then be provided to an application running within the application viewer, perhaps using an API provided by the application viewer to the application, or through some other means. Such capability might be used, in at least in some implementations, along with a local operating environment to provide functionality that may not otherwise be possible to provide using, for example, a web application hosted in a web browser. For example, a user that interacts with an exemplary application that has the capability of accepting images or videos, such as photographs or movies perhaps, might initially store received images or videos locally using a local data store associated with the local operating environment. Then, perhaps in the background, such an application might cause or use the operating environment to synchronize the images and videos with other devices, including with one or more remote data stores. In doing so, the application might provide an improved user experience for uploading large files, especially compared with typical web-based image or video applications that may be limited to the functionality provided by a web browser, or be limited to executing within a web browser, even through the use of extension technologies such as ActiveX controls.

In the same or other implementations, other additional functionality provided by an exemplary application viewer might include richer clipboard interaction functionality including possibly interaction with clipboard formats such as the "Live Clipboard" format, or other formats that may include additional information. In the same or yet other implementations, an application viewer application might provide "native" access (that is, access that doesn't require extensions or additional code) to other data. For example, an application viewer might provide applications hosted within the application viewer access to information stored or associated with an instance of a personal information management application, like contacts, calendar items, and the like.

In some cases, at least some of the previously described additional functionality might also be provided by a web browser "extension" of some form (such as a "plug-in," "browser helper object," "control," or the like). However, the inclusion of such functionality with an application viewer—so that extensions aren't required—may enable applications to assume or rely on such functionality without requiring additional work or configuration. In addition, in some implementations it may be possible to extend the additional functionality provided by an application viewer application using a mechanism similar to browser extensions, or even using the same browser extensions that might be used in a web browser.

The previously described figure includes a variety of exemplary user interface elements that might be used in an application viewer or elsewhere. Generally, the description of this figure may have been made in some cases with reference to other figures or description provided herein. However, it should be understood that the elements described with reference to any particular figure or other description are not intended to be limited to being used with the elements described with reference to that figure, to other figures, or to the description provided herein. In addition, while this exemplary figure may indicate particular elements, in some implementations not all of these elements may exist, and in some implementations additional elements may exist. Furthermore, it should be understood that the exemplary graphical representation of the user interface is provided only for purposes of discussion and explanation, and in no way should be construed as limiting the scope of the user interface or techniques described herein to any particular graphical or other representation—the user interface may be implemented in a variety of ways, using a variety of technologies, with a variety of differences from the exemplary user interface, and so on, without departing from the elements of the user interface as described herein.

Figure 9:
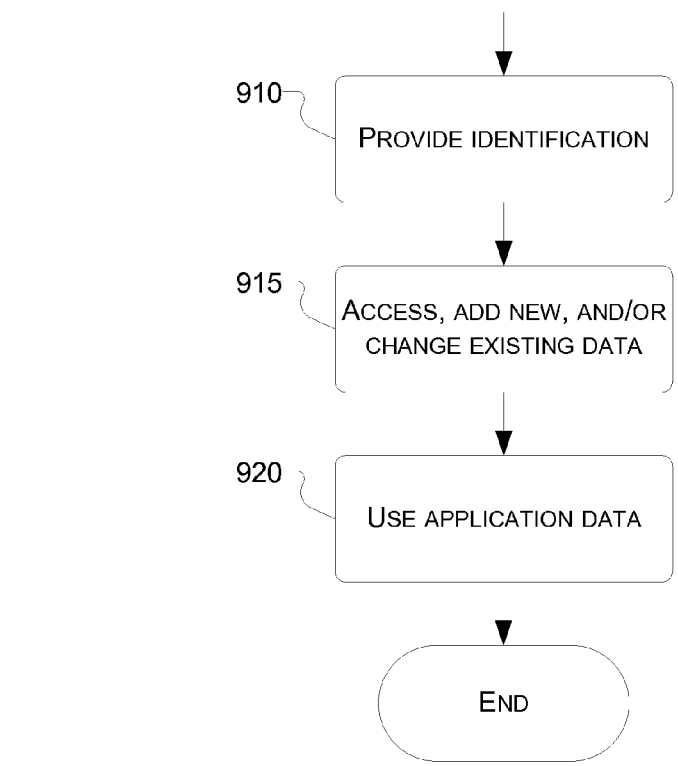
FIG. 9 illustrates an exemplary generalized operational flow including various operations that may be performed when accessing or changing data from another application or service.

Turning now to FIG. 9, shown therein is an exemplary generalized operational flow 900 including various operations that may be performed when accessing or changing data from another application or service. The following description of FIG. 9 may be made with reference to other figures. However, it should be understood that the operational flow described with reference to FIG. 9 is not intended to be limited to being used with the elements described with reference to these other figures. In addition, while the exemplary operational flow of FIG. 9 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

Some of the techniques described herein enable the creation and use of online and offline applications. In some of such applications, information is synchronized between different computing devices including between devices that might be owned or associated with a particular user or person—like a desktop or laptop computer, a mobile phone, and so on—as well as devices such as servers in data centers. That is, in some cases a remote data store that includes or synchronizes a particular user's information or application data may be considered to be associated with that particular user and possibly to be a "device in that user's mesh," because it contains at least some of the application data associated with that user. As has been described elsewhere herein, in some implementations applications and application data may be created on one device and then synchronized throughout a mesh of devices, and may thereafter be available from some or all of the devices in that mesh. This relative ubiquity of application data on multiple devices may in some implementations enable functionality that is not currently possible with many or perhaps any other solutions or techniques for providing applications that work in an offline mode.

In one example demonstrating such additional functionality, a user might use an application to manage a "wish list" of products that the user desires. If such an application is developed or deployed as described elsewhere herein, it may in some implementations be available to a user both as a local application that is accessible when a user is offline and as an online application using, for example, a web browser and one or more remote servers that host the application. Wish list information the user enters may be synchronized throughout the user's mesh of devices, including to one or more remote data stores that may be located on one or more machines in one or more data centers. Then, in some implementations, it may be possible for some "third party" or external site, server, executable code, or other entity to then access some or all of the application data associated with the user through the remote data store or some other mechanism (including perhaps through direct access to a user's devices). In the wish list example, a third party or external e-commerce site might access the user's wish list information and incorporate it into a wish list that the third party maintains. In another example, a user might add photos or videos to one device, the photos or videos might be synchronized to other devices in the user's mesh, and then a third party photo-sharing or video-sharing site might retrieve the photos and videos and make them available online through, say, a web site provided or associated with the third party photo-sharing or video-sharing site.

In addition to the "pull" examples in the previous paragraph, where application data associated with a user was "pulled" to be used in some other context, a third party or external site might also "push" data into a user's mesh. For example, a user might install or use an application to view newspaper or magazine articles. In the middle of the night, say, or when a new edition of the magazine is published, the newspaper or magazine might add new data—newspaper articles, magazine articles, advertisements, and so on—to the user's mesh. The newspaper or magazine might add this application data by transmitting the data to a device associated with the user, including a remote data store in a data center. This data might then be synchronized throughout the user's mesh and so, perhaps, might be available for reading when the user next uses his mobile phone, laptop, or the like.

To provide functionality similar in at least some implementations to that introduced in the previous paragraphs, in an exemplary implementation of operation 910, a third party or external site (or some other entity external to the user or that exists outside the context of the application) might provide some form or type of identification to a data store or other device associated with a user. The identification may take one or more of a variety of forms and may have a variety of uses. In some implementations the identification might identify characteristics such as a user associated with data to be accessed or changed, an application or application instance (perhaps including applications embodied in some cases using application packages, as described elsewhere herein), and possibly the third party or external entity that is accessing or changing the data. In the same or other implementations, the identification may include data related to one or more security implementations, to provide functionality that may, for example, limit the data that can be accessed or changed depending on the external entity, on permissions associated with an application or specified by a user, and so on. For example, a user might enable a particular external entity to read some or all of the data associated with one or more particular applications, might enable the same or some other particular external entity to read and write data associated with some other application, and might enable reading and writing of data using a variety of other combinations of permissions. In the same or other implementations, and possibly only with user consent, user data associated an application authored or distributed by a particular external entity may be accessible to that external entity.

In some implementations, access to a user's data by an external entity may be managed in a similar way or in the same way as access to a user's data is managed, for example, when sharing data with other users. That is, for example, when a user shares data with another user—for example, as was introduced previously and then described in more detail with reference to FIG. 6—the shared data—such as a mesh object—may include or be associated with a "member list" or other metadata that specifies the users that may access the data, including permissions that may specify the operations—reading, writing, and so on—different users may perform using the data. In some implementations, the same or a similar member list implementation may be used to provide access to an external site or other entity. With a wish list application, for example, the e-commerce site might be listed as a member associated with the wish list data, and might have permissions to read, but perhaps not to change, the user's wish list data.

In at least some implementations of operation 915, the external entity may access application data, add new application data, or change existing application data, or some combination thereof. In this context, and elsewhere herein, changing application data may in some implementations refer both to updating existing data and to deleting existing data. The manner in which the external entity implements this operation may depend on characteristics such as how such functionality is provided or exposed by, for example, a data store that holds user data. For example, in some implementations an external entity might submit HTTP requests—perhaps in a "RESTful" fashion using HTTP verbs such as GET, PUT, and so on—to a web server associated with the data store. In the same or another implementation, an external entity might synchronize data between one or more user devices, including between a remote data store that stores data associated with a user, and one or more data stores associated with the external entity. In some implementations, such synchronization might be performed using a technology such as the FeedSync protocol discussed previously. In the same or other implementations, data may be accessed, added, or changed in a variety of other ways. If new application data is added, or data is changed, such data may then in some cases be synchronized to other devices associated with the particular user, as has been described previously.

Finally, in some implementations, an external entity may use accessed or retrieved application data in an exemplary implementation of operation 920. For example, an external entity might store some or all of the retrieved data in some other data store managed by or associated with the external entity as described, for example, with reference to the "push" and "pull" examples provided previously. In the same or other implementations, an external entity might display such retrieved application data, or may undertake a variety of other operations using the retrieved application data.

Example Computing Environment

Figure 10:
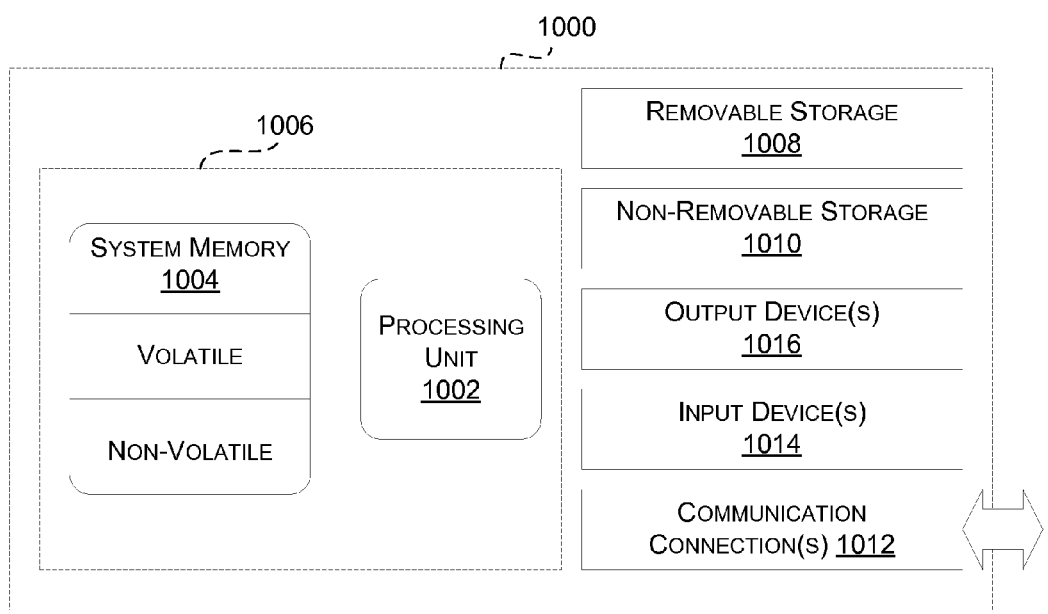
FIG. 10 illustrates an exemplary computing environment in which the various technologies described herein may be implemented.

Turning now to FIG. 10, this figure and the related description are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1000 illustrated in FIG. 10.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 1000 illustrated in FIG. 10, in its most basic configuration, includes at least one processing unit 1002 and memory 1004. In some implementations, the computing device 1000 may implement at least part of, for example, one of the devices or servers described previously with reference to FIG. 1 (and other figures), such as the user device 110, the server 150, the user device B 160, and so on. In some implementations, the processing unit 1002 may be a general purpose central processing unit (CPU), as exists, for example, on a variety of computers, including desktop, laptop, and server computers. Depending on the exact configuration and type of computing device, the memory 1004 may be volatile (such as RAM), non-volatile (such as ROM, flash memory, etc.), or some combination of the two. This most basic configuration is illustrated in FIG. 10 by dashed line 1006. Additionally, the computing device 1000 may also have additional features and functionality. For example, the computing device 1000 may also include additional storage (removable and/or non-removable) including, but not limited to, magnetic or optical disks or tape. Such additional storage is illustrated in FIG. 10 by the removable storage 1008 and the non-removable storage 1010.

The computing device 1000 may also contain one or more communications connection(s) 1012 that allow the computing device 1000 to communicate with other devices and services. For example, the computing device might have one or more connections to a variety of communication means or computing devices, including, for example, connections to or between devices as described previously with reference to FIG. 1 and other figures. The computing device 1000 may also have one or more input device(s) 1014 such as an image input devices like cameras or scanners, keyboards, mice, pens, voice input devices including microphone arrays, touch input devices, and so on. One or more output device(s) 1016 such as a display, speakers, printer, and so on, may also be included in the computing device 1000.

Those skilled in the art will appreciate that the technologies described herein may be practiced with computing devices other than the computing device 1000 illustrated in FIG. 10. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 10, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
providing, on a computing device of a user, a local operating environment including a local web server;
providing, on the computing device, an application package for a web application installed on the computing device, the application package including a user interface of the web application and executable code of the web application, wherein the web application runs in an online mode for communication with a remote web server when the computing device is connected to the remote web server and runs in an offline mode for communication with the local web server when the computing device is not connected to the remote web server;
hosting the web application within a viewer application on the computing device that is separate from a web browser on the computing device;
displaying, by the viewer application, the user interface of the web application;
receiving, by the viewer application, user interaction with the user interface of the web application;
executing, by the viewer application, the executable code of the web application to determine a data portion of a web request address that is based on the user interaction with the user interface of the web application, wherein:
the data portion of the web request address includes contents that can be interpreted by both the remote web server and the local web server, and
the data portion of the web request address is identical regardless of whether the web application is running in the online mode or the offline mode;
determining, by the viewer application, a host portion of the web request address that is not controlled by the web application and that identifies different hosts depending on whether the web application is running in the online mode or the offline mode, wherein the host portion of the web request address identifies either the remote web server or the local web server;

generating, by the viewer application, a web request directly addressed to the local web server when the web application is running in the offline mode, wherein the web request is addressed using the determined host portion of the web request address that identifies the local web server and the determined data portion of the web request address that includes the contents to be interpreted by the local web server;

issuing, by the viewer application, the web request directly to the local web server when the web application is running in the offline mode, wherein the web request issued by the viewer application is not addressed to the remote web server and does not require redirection to the local web server; and receiving, by the local web server, the web request directly from the viewer application when the web application is running in the offline mode, wherein the web request received by the local web server is not addressed to the remote web server and does not require interception by the local web server.

2. The method of claim 1, further comprising:
updating a local data store on the computing device with a change to application data associated with the web application in response to the web request; and
synchronizing the change to application data with a remote data store of the remote web server when the web application is running in the online mode.

3. The method of claim 1, wherein installing the local operating environment on the computing device does not require elevated privileges on the computing device.

4. The method of claim 1, further comprising:
updating a local data store on the computing device with a change to application data associated with the web application in response to the web request; and
synchronizing the change to application data with a data store located on a second computing device of the user when the web application is running in the online mode.

5. The method of claim 1, wherein:
the application package comprises at least one HyperText Markup Language (HTML) page and at least one JavaScript function included in or referenced by the HTML page, and
the application package is downloaded to the computing device from the remote web server.

6. The method of claim 1, wherein the local operating environment includes a local data store, and wherein the local operating environment is capable of persisting data received by the local web server using the local data store.

7. The method of claim 1, wherein:
the application package is defined by a manifest that references components of the user interface of the web application and the executable code of the web application, and
the manifest provides configuration settings associated with the web application.

8. The method of claim 1, further comprising:
receiving input from the user indicating a desire to use the web application installed on the computing device;
receiving identification information that identifies the user;
displaying information describing the web application; and
receiving input from the user confirming the desire to use the web application.

9. The method of claim 1, further comprising:
provisioning the web application for the user by associating the web application with the user and creating at least a portion of application data associated with the user and with the web application.

10. The method of claim 1, further comprising:
receiving, at the computing device, the application package from a remote computing device associated with a second user.

11. The method of claim 10, wherein an application manifest defines the user interface and the executable code included in the application package.

12. The method of claim 1, wherein the computing device includes a synchronization mechanism that is configured to transfer application data from the computing device to another computing device of the user and to a remote computing device of a second user.

13. The method of claim 1, further comprising:
receiving input from the user indicating a desire to share the application package with a second user;
receiving, from the second user, an indication of accepting a request to share the application package;
receiving a change, made by the second user, to application data; and
synchronizing the change to application data with the computing device and at least one other computing device associated with the user, wherein the change to application data made by the second user is accessible when the user interacts with the web application using the computing device or using the at least one other computing device.

14. The method of claim 1 wherein the viewer application provides additional functionality to the web application installed on the computing device.

15. The method of claim 14 wherein the additional functionality comprises at least one of:
drag and drop of images;
drag and drop of files;
rich clipboard interaction functionality;
native access to data located on the computing device; and
web browser extension functionality.

16. The method of claim 1, wherein the computing device is included in a mesh of devices associated with the user, the method further comprising:
providing, by the computing device, the application package to a different device included in the mesh of devices associated with the user; and
receiving, at the local web server on the computing device, a web request that is issued by the different device and that is addressed to the local web server on the computing device.

17. A computing device, comprising:
a processor for executing computer-executable instructions; and
memory storing computer-executable instructions that, when executed by the processor, cause the computing device to perform steps including:
providing, on the computing device, a local operating environment including a local web server;
providing, on the computing device, an application package for a web application installed on the computing device, the application package including a user interface of the web application and executable code of the web application, wherein the web application runs in an online mode for communication with a remote web server when the computing device is connected to the remote web server and runs in an offline mode for communication with the local web server when the computing device is not connected to the remote web server;

hosting the web application within a viewer application on the computing device that is separate from a web browser on the computing device;

displaying, by the viewer application, the user interface of the web application;

receiving, by the viewer application, user interaction with the user interface of the web application;

executing, by the viewer application, the executable code of the web application to determine a data portion of a web request address that is based on the user interaction with the user interface of the web application, wherein:

the data portion of the web request address includes contents that can be interpreted by both the remote web server and the local web server, the data portion of the web request address is identical regardless of whether the web application is running in the online mode or the offline mode;

determining, by the viewer application, a host portion of the web request address that is not controlled by the web application and that identifies different hosts depending on whether the web application is running in the online mode or the offline mode, wherein the host portion of the web request address identifies either the remote web server or the local web server;

generating, by the viewer application, a web request directly addressed to the local web server when the web application is running in the offline mode, wherein the web request is addressed using the determined host portion of the web request address that identifies the local web server and the determined data portion of the web request address that includes the contents to be interpreted by the local web server;

issuing, by the viewer application, the web request directly to the local web server when the web application is running in the offline mode, wherein the web request issued by the viewer application is not addressed to the remote web server and does not require redirection to the local web server; and receiving, by the local web server, the web request directly from the viewer application when the web application is running in the offline mode, wherein the web request received by the local web server is not addressed to the remote web server and does not require interception by the local web server.

18. The computing device of claim 17, wherein the computing device is included in a mesh of devices associated with the user, and wherein the steps further include:

providing, by the computing device, the application package to a different device included in the mesh of devices associated with the user; and receiving, at the local web server on the computing device, a web request that is issued by the different device and that is addressed to the local web server on the computing device.

19. A computer-readable storage medium that does not consist of a signal, the computer-readable storage medium storing computer-executable instructions that, when executed, cause a computing device to perform steps including:

providing, on the computing device, a local operating environment including a local web server;

providing, on the computing device, an application package for a web application installed on the computing device, the application package including a user interface of the web application and executable code of the web application, wherein the web application runs in an online mode for communication with a remote web server when the computing device is connected to the remote web server and runs in an offline mode for communication with the local web server when the computing device is not connected to the remote web server;

hosting the web application within a viewer application on the computing device that is separate from a web browser on the computing device;

displaying, by the viewer application, the user interface of the web application;

receiving, by the viewer application, user interaction with the user interface of the web application;

executing, by the viewer application, the executable code of the web application to determine a data portion of a web request address that is based on the user interaction with the user interface of the web application, wherein:

the data portion of the web request address includes contents that can be interpreted by both the remote web server and the local web server, the data portion of the web request address is identical regardless of whether the web application is running in the online mode or the offline mode;

determining, by the viewer application, a host portion of the web request address that is not controlled by the web application and that identifies different hosts depending on whether the web application is running in the online mode or the offline mode, wherein the host portion of the web request address identifies either the remote web server or the local web server;

generating, by the viewer application, a web request directly addressed to the local web server when the web application is running in the offline mode, wherein the web request is addressed using the determined host portion of the web request address that identifies the local web server and the determined data portion of the web request address that includes the contents to be interpreted by the local web server;

issuing, by the viewer application, the web request directly to the local web server when the web application is running in the offline mode, wherein the web request issued by the viewer application is not addressed to the remote web server and does not require redirection to the local web server; and receiving, by the local web server, the web request directly from the viewer application when the web application is running in the offline mode, wherein the web request received by the local web server is not addressed to the remote web server and does not require interception by the local web server.

20. The computer-readable storage medium of claim 19, wherein the computing device is included in a mesh of devices associated with the user, and wherein the steps further include:

providing, by the computing device, the application package to a different device included in the mesh of devices associated with the user; and receiving, at the local web server on the computing device, a web request that is issued by the different device and that is addressed to the local web server on the computing device.

* * * * *